United States Patent
Xu et al.

(10) Patent No.: US 11,683,137 B2
(45) Date of Patent: Jun. 20, 2023

(54) ELECTRONIC APPARATUS, WIRELESS COMMUNICATION METHOD AND COMPUTER-READABLE MEDIUM

(71) Applicant: Sony Corporation, Tokyo (JP)

(72) Inventors: Xiaodong Xu, Beijing (CN); Mengying Sun, Beijing (CN); Guanyu Chen, Beijing (CN); Yingting Yuan, Beijing (CN); Wenbo Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 221 days.

(21) Appl. No.: 17/256,655

(22) PCT Filed: Aug. 2, 2019

(86) PCT No.: PCT/CN2019/098956
§ 371 (c)(1),
(2) Date: Dec. 29, 2020

(87) PCT Pub. No.: WO2020/029868
PCT Pub. Date: Feb. 13, 2020

(65) Prior Publication Data
US 2021/0143959 A1 May 13, 2021

(30) Foreign Application Priority Data
Aug. 10, 2018 (CN) .......................... 201810909745.8

(51) Int. Cl.
*H04W 76/16* (2018.01)
*H04L 5/00* (2006.01)
(Continued)

(52) U.S. Cl.
CPC ......... *H04L 5/0048* (2013.01); *H04B 7/0626* (2013.01); *H04W 8/005* (2013.01);
(Continued)

(58) Field of Classification Search
CPC ........................... H04W 8/005; H04W 56/001
See application file for complete search history.

(56) References Cited

U.S. PATENT DOCUMENTS

2011/0200137 A1* 8/2011 Han ...................... H04L 5/0048
375/295
2017/0005913 A1* 1/2017 Hampel ................ H04L 45/245
(Continued)

FOREIGN PATENT DOCUMENTS

CN            107852363 A        3/2018

OTHER PUBLICATIONS

International Search Report and Written Opinion dated Nov. 5, 2019, received for PCT Application No. PCT/CN2019/098956, Filed on Aug. 2, 2019, 9 pages including English Translation.
(Continued)

*Primary Examiner* — Fahmida S Chowdhury
(74) *Attorney, Agent, or Firm* — Xsensus LLP

(57) ABSTRACT

The present disclosure relates to an electronic apparatus, a wireless communication method and a computer-readable medium. The electronic apparatus for wireless communication according to one embodiment comprises a processing circuit. The processing circuit is configured to perform control to send or receive configuration information. The configuration information is related to configuration of a reference signal used in a discovery process of an integrated access backhaul (IAB) link node.

3 Claims, 35 Drawing Sheets

(51) Int. Cl.
    *H04B 7/06*     (2006.01)
    *H04W 8/00*     (2009.01)
    *H04W 40/22*     (2009.01)
    *H04W 48/16*     (2009.01)
    *H04W 56/00*     (2009.01)

(52) U.S. Cl.
    CPC ........... *H04W 40/22* (2013.01); *H04W 48/16* (2013.01); *H04W 56/001* (2013.01); *H04W 76/16* (2018.02)

(56) References Cited

U.S. PATENT DOCUMENTS

| | | | |
|---|---|---|---|
| 2017/0064731 A1* | 3/2017 | Wang | H04W 72/1263 |
| 2018/0092056 A1* | 3/2018 | Zeng | H04L 5/0053 |
| 2018/0092139 A1* | 3/2018 | Novlan | H04W 76/12 |
| 2018/0109344 A1* | 4/2018 | Ly | H04L 5/0048 |
| 2019/0059111 A1* | 2/2019 | Zhang | H04W 74/0833 |
| 2019/0350023 A1* | 11/2019 | Novlan | H04L 5/16 |
| 2020/0029384 A1* | 1/2020 | Hong | H04W 36/305 |
| 2020/0045645 A1* | 2/2020 | Chopra | H04W 52/365 |
| 2021/0298055 A1* | 9/2021 | Harada | H04W 72/23 |
| 2021/0321297 A1* | 10/2021 | Harada | H04W 40/12 |

OTHER PUBLICATIONS

3GPP, "Study on Integrated Access and Backhaul", 3rd Generation Partnership Project, 3GPP TR 38.874 V0.3.2, Jun. 20, 2018, pp. 1-39.

* cited by examiner

ELECTRONIC APPARATUS, WIRELESS COMMUNICATION METHOD AND COMPUTER-READABLE MEDIUM

CROSS-REFERENCE TO RELATED APPLICATIONS

The present application is based on PCT filing PCT/CN2019/098956, filed Aug. 2, 2019, which claims priority to CN 201810909745.8, filed Aug. 10, 2018, the entire contents of each are incorporated herein by reference.

FIELD

The present disclosure relates generally to the field of wireless communication, and more particularly to an electronic device, a wireless communication method and a computer readable medium related to an Integrated Access and Backhaul link (IAB).

BACKGROUND

In order to implement a flexible deployment of 5G NR(New Radio) base stations, research on IAB technology has been proceeded. First, the research relates to a relay node with fixed position. As shown in FIG. 16, IAB node A establishes a connection with a core network by a cable, and this node is referred to as an IAB donor node. IAB nodes B and C establish a connection with an IAB donor in a wireless backhaul (BH) manner, and then establish a connection with the core network. The nodes B and C are referred to as IAB nodes.

A periodic discovery is needed for IAB nodes that access the network to detect a surrounding candidate IAB node, as shown in FIGS. 17 and 18. The discovery process facilitates finding a suitable candidate to establish multiple BH connections or backup connections to provide the required robustness.

SUMMARY

Brief summary of the present disclosure is given hereinafter, so as to provide basic understanding in some aspects of the present disclosure. However, it should be understood that this summary is not an exhaustive overview of the present disclosure. It is neither intended to determine key part or critical part of the present disclosure, nor intended to define the scope of the present disclosure. An object of the summary is only to give some concepts in a simplified manner, which serves as a preface of a more detailed description described later.

According to an embodiment, an electronic device for wireless communication includes a processing circuitry. The processing circuitry is configured to: preform control to transmit or receive configuration information related to configuration of a reference signal for a discovery process of an Integrated Access and Backhaul link node.

According to another embodiment, a wireless communication method includes: transmitting or receiving configuration information related to configuration of a reference signal for a discovery process of an Integrated Access and Backhaul link node.

According to yet another embodiment, an electronic device for wireless communication includes a processing circuitry. The processing circuitry is configured to: acquire hop count information indicating a relay hop count of a relay node from a donor node. The donor node is an Integrated Access and Backhaul link node which is in wired connection with a core network, and the relay node is a node which is not in wired connection with the core network.

According to still another embodiment, a wireless communication method includes: acquiring hop count information indicating a relay hop count of a relay node from a donor node. The donor node is an Integrated Access and Backhaul link node which is in wired connection with a core network, and the relay node is a node which is not in wired connection with the core network.

According to yet another embodiment, an electronic device for wireless communication includes a processing circuitry. The processing circuitry is configured to: determine, based on a time offset between signals of different nodes connected via a backhaul link, an adjustment of synchronization time for at least one node of the different nodes.

According to still another embodiment, a wireless communication method includes: determining, based on a time offset between signals of different nodes connected via a backhaul link, an adjustment of synchronization time for at least one node of the different nodes.

According to an embodiment of the present disclosure, a computer readable medium is further provided. The computer readable medium includes executable instructions that, when executed by an information processing apparatus, cause the information processing apparatus to implement the method according to the above embodiments.

According to the embodiments of the present disclosure, a discovery between IAB nodes can be effectively implemented.

BRIEF DESCRIPTION OF THE DRAWINGS

The present disclosure may be understood better with reference to the description given in conjunction with the drawings in the following. The same or similar component is indicated by the same or similar reference numeral throughout all the drawings. The drawings together with the detailed description below are incorporated in the present specification and form a part of the present specification, and are used to further illustrate preferable embodiments of the present disclosure and explain the principle and advantages of the present disclosure. In the drawings.

DETAILED DESCRIPTION OF EMBODIMENTS

Figure 1:
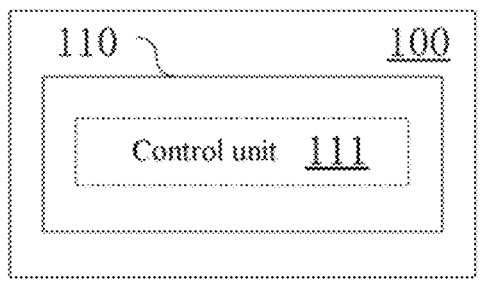
FIG. 1 is a block diagram showing a configuration example of an electronic device for wireless communication according to an embodiment of the present disclosure.

Embodiments of the present disclosure will be described below with reference to the drawings. Elements and features described in one of the drawings or one embodiment of the present disclosure may be combined with elements and features described in one or more other drawings or embodiments. It should be noted that representations and descriptions of components and processing which are irrelevant to the present disclosure and known by those skilled in the art are omitted in the drawings and the specification for clarity.

As shown in FIG. 1, an electronic device 100 for wireless communication according to the present embodiment includes a processing circuitry 110. The processing circuitry 110 may be implemented, for example, by a specific chip, a chipset, a central processing unit (CPU), or the like.

The processing circuitry 110 includes a control unit 111. It should be noted that, although the control unit 111 and the like are shown in a form of functional blocks in the drawings, it should be understood that functions of the respective units may be implemented as a whole by the processing circuitry, and it is not necessary to be implemented by discrete actual components in the processing circuitry. In addition, although the processing circuitry is shown by a block in the drawings, the electronic device may include multiple processing circuitry, and functions of the respective units may be distributed to the multiple processing circuitry, thereby cooperatively operating by the multiple processing circuitry to perform these functions.

The control unit 111 is configured to preform control to transmit or receive configuration information related to configuration of a reference signal for a discovery process of an Integrated Access and Backhaul link (IAB) node.

As described above, the electronic device according to an embodiment of the present disclosure is configured to discover an IAB node. In order to deploy cellular cells more flexibly and densely, IAB is introduced to implement wireless connections between base stations. In the network, some base stations (IAB donor nodes) are connected with a core network by means of, for example, optical fiber cables, and the rest of deployed access points (small base stations or relay devices) (which may be referred to as IAB relay nodes or IAB nodes herein) are connected with IAB donor nodes via wireless links in a single-hop manner and a multi-hop manner. IAB nodes connected to the network need to periodically discover surrounding candidate backhaul links (BH). In a case of multi-hop connections, among two adjacent nodes on the link, a node that is closer to the donor node may be referred to as an superior node or a parent node, and a node that is farther away from the donor node may be referred to as a subordinate node or a child node.

The electronic device according to the present embodiment may be implemented on the side of an IAB donor node or an IAB relay node. In a case of being implemented on the donor node side, the electronic device may, for example, transmit configuration information to a subordinate node. In a case of being implemented on the side of the relay node, the electronic device may receive configuration information from the donor node or may transmit the configuration information to a subordinate node.

Furthermore, in a case that configuration information is further related to an access link (AC) between a user equipment (UE) and an access point (IAB node), the electronic device may also be implemented at the UE side, and may, for example, receive configuration information from the access point.

As an example, a synchronization signal block (SSB) or a channel state information reference signal (CSI-RS) may be used as a reference signal for a discovery process of an IAB node.

According to an embodiment, the configuration information includes a multiplexing manner of a SSB for an access link and a SSB for a backhaul link.

A SSB signal for cell access by the UE is configured in a unit of one half-frame. The base station broadcasts periodically, and configures a measurement period and a measurement duration for the UE by system information blocks SIB2 and SIB4, or may perform configuration by special signaling. In order not to produce interference to an access of the UE, the SSB for the access link (AC SSB) and the SSB for the backhaul link (BH SSB) are orthogonal in time.

According to an exemplary manner, a part of SSB resource positions in a period of the SSB for the access link may be allocated to the SSB for the backhaul link.

Figure 19A:
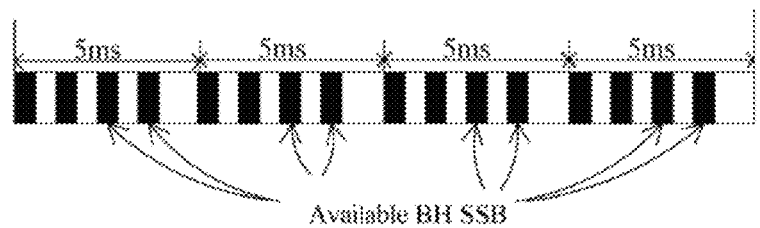
FIG. 19A, FIG. 19B and FIG. 19C show an example of a configuration of a synchronization signal block (SSB)

As shown in FIG. 19A, in a SSB signal configured in a unit of one half-frame (5 ms), a part of the SSB resource positions (for example, the last two positions) may be allocated to the BH SSB.

According to another exemplary manner, a period of the SSB for the access link may be increased, and a SSB for the backhaul link may be arranged in an increased part of the period.

Figure 19B:
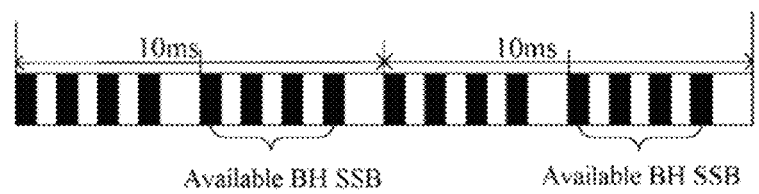

As shown in FIG. 19B, a period in a unit of one half-frame (5 ms) is extended to a period in a unit of two half-frames (10 ms), and SSB resource positions in the added one half-frame is allocated to the BH SSB. It should be noted that all the SSB resource positions in the increased part of the period may be not allocated to the BH SSB, and some SSB resource positions may be allocated to the AC SSB.

Figure 19C:
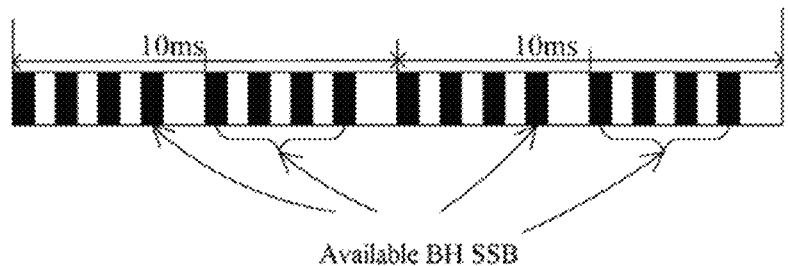

Furthermore, a combination of the above methods may also be adopted, that is, when a part of SSB resource positions in an original period of the AC SSB is allocated to the BH SSB, a period of the AC SSB is increased and a BH SSB is arranged in an increased part of the period, as shown in FIG. 19C.

The present disclosure is not limited to specific configuration, such as the number and position and the like of AC SSB and BH SSB, in the above example.

Furthermore, in order to reduce an impact on an access of the UE, an access quality supervision mechanism for a UE may be introduced. After an AC SSB and a BH SSB are configured, access performances and synchronization performances of the UE may be periodically detected, and an adjusted is performed correspondingly in a case of a degradation of access performances.

According to an embodiment, a multiplexing manner of an AC SSB and a BH SSB may be adjusted based on an access performance of a user equipment. For example, in a case of a degradation of access performances, a SSB for an access link may be increased.

For example, the adjustment may be triggered in a case that an access latency of the user equipment exceeds a predetermined threshold.

Figure 20:
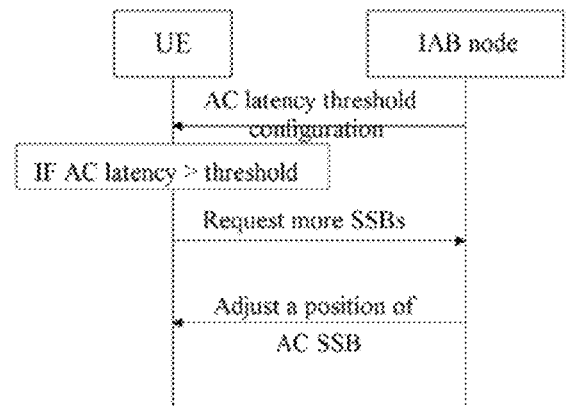
FIG. 20 shows an exemplary process of evaluating an access performance of a user equipment (UE)

More specifically, an access latency threshold may be introduced. In a case that the access latency of the UE is greater than the threshold due to a reduction of the AC SSB, the UE may request an AC SSB to an IAB node. The threshold may be preconfigured, or may be obtained from a SSB signal. In response to the request of the UE, the IAB node may adjust a position of the AC SSB, as shown in FIG. 20.

For example, the access latency threshold may be indicated by adding field information in the SSB signal, as shown in Table 1-1 below.

TABLE 1-1

| Field | Value and description |
| --- | --- |
| AC latency threshold | Bit string, latency threshold of UE |

The adjustment of UE accessing and monitoring SSB resources may follow the existing SSB monitoring configuration, including a duration (the number of sub-frame that is monitored) and a monitoring period (5 ms, 10 ms, 20 ms, 40 ms, 80 ms . . . ).

Furthermore, an adjustment of the AC SSB may include, for example, configuring an additional AC SSB position for the UE by special signaling or reducing a period of monitoring a SSB for the UE. Alternatively, BH SSB positions within a half-frame may be reduced or a BH SSB period may be increased for an AC SSB.

Furthermore, for a UE that has not accessed the network, since the UE does not know a position of an AC SSB of a cell before accessing the cell, it is possible to detect the BH SSB.

In order to enable the UE to determine whether the received SSB is an AC SSB or a BH SSB, a power level may be used to distinguish the AC SSB from the BH SSB. For example, in a case that the received SSB is within a certain range, it is considered that the received SSB is an AC SSB. Alternatively, some SSB positions may be specifically reserved for the AC SSB of the UE (which has no access to the network).

Correspondingly, according to an embodiment, different power levels may be applied to the SSB for the access link and the SSB for the backhaul link, or a specific SSB resource position may be set as a SSB for the access link.

An exemplary embodiment in which a SSB is used as a reference signal for a discovery process of an IAB node is described above. As described above, a CSI-RS may also be used as a reference signal for a discovery process of an IAB node. CSI-RS transmission may be individually configured for some connections without direct impact on other connections or measurements. Furthermore, the CSI-RS transmission may be configured for a beam that is narrower than a beam of the SSB, and therefore, it is possible to provide a possibility of beam evaluation for a candidate BH link, which is beneficial for fast switching to a connection of the candidate link.

Correspondingly, the reference signal for the discovery process of the IAB node may include a CSI-RS, and configuration information related to the reference signal may include a multiplexing manner of a CSI-RS for an access link (AC CSI-RS) and a CSI-RS for a backhaul link (BH CSI-RS).

According to an embodiment, the CSI-RS for the backhaul link may be transmitted using a directional beam, and time-frequency resources of the CSI-RS for the access link and the CSI-RS for the backhaul link may be multiplexed.

More specifically, the donor node may configure parameter information of a directional beam for the relay node based on physical position information of the relay node and a connection relationship among the relay nodes. For example, the donor node may obtain the physical position information or connection state of the relay node from a core network. In addition, the physical position information of the relay node and the connection relationship among the relay nodes may also be reported by the relay node to the donor node.

The donor node may configure parameter information of a directional beam of the BH SCI-RS for the relay node. The parameters may include, for example, time-frequency resources, transmission directions of the directional beams, and time-frequency resources of the monitored directional beam and the like.

Figure 21:
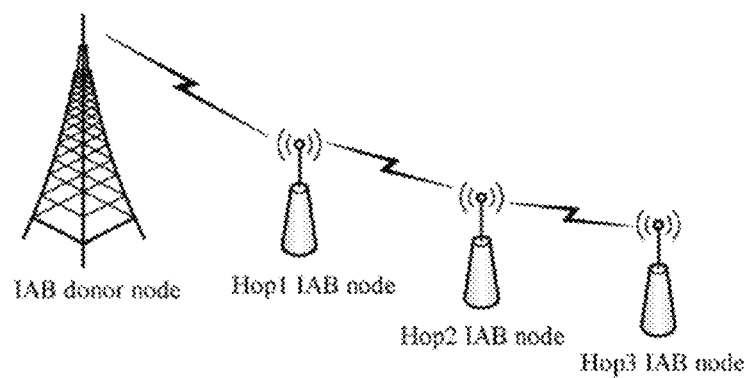
FIG. 21 shows an example of an IAB scenario.
Figure 22:
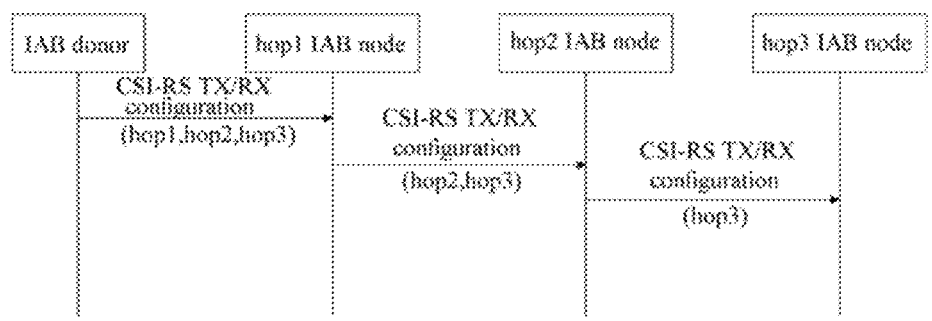
FIG. 22 shows an exemplary process of a configuration of a channel state information reference signal (CSI-RS)

The time-frequency resources configured by the donor node may be scheduled periodically, non-periodically or semi-statically. FIG. 22 shows a signaling flow for a configuration in an exemplary scenario shown in FIG. 21. In FIG. 22, hop1 represents a relay node with a hop count of 1, that is, a child node of the donor node; hop2 represents a relay node with a hop count of 2, that is, a child node of the hop1 node; and hop3 represents a relay node with a hop count of 3, that is a child node of hop2 node. As shown in FIG. 22, the donor node transmits CSI-RS transmission and reception configurations of the hop1 node, the hop2 node and the hop3 node to the hop1 node, the hop1 node transmits CSI-RS transmission and reception configurations of the hop2 node and the hop3 node to the hop2 node, and the hop2 node transmits CSI-RS transmission and reception configuration of the the hop3 node to the hop3 node.

The fields newly added in the CSI-RS transmission and reception configuration provided by the donor node (as shown in Table 1-2 below) may include configurations of all child nodes, and each of the child nodes obtains configuration thereof.

TABLE 1-2

| Field | Value and description |
| --- | --- |
| BH CSI-RS beam direction (child node) | Bit string |
| BH CSI-RS resource type (child node) | {non-periodic, semi-static, periodic} |

TABLE 1-2-continued

| Field | Value and description |
| --- | --- |
| BH CSI-RS-ResourceSetList (child node) | Bit string, resources for transmitting a CSI-RS |
| BH CSI-measConfig (child node) | Unit, resources for monitoring a CSI-RS by a IAB node |

Furthermore, the donor node may configure parameter information of directional beams for the relay node and a candidate node around the relay node based on direction information related to the candidate node which is detected and reported by the relay node.

Figure 23:
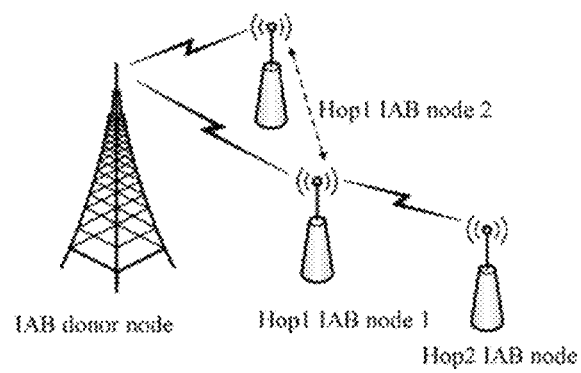
FIG. 23 shows an example of an IAB scenario.

FIG. 23 shows an exemplary scenario, where a hop1 IAB node 1 represents a relay node with a hop count of 1, a hop1 IAB node 2 represents another relay node with a hop count of 1, and a hop2 IAB node represents a relay node with a hop count of 2, that is, a child node of the hop1 IAB node 1.

Figure 24:
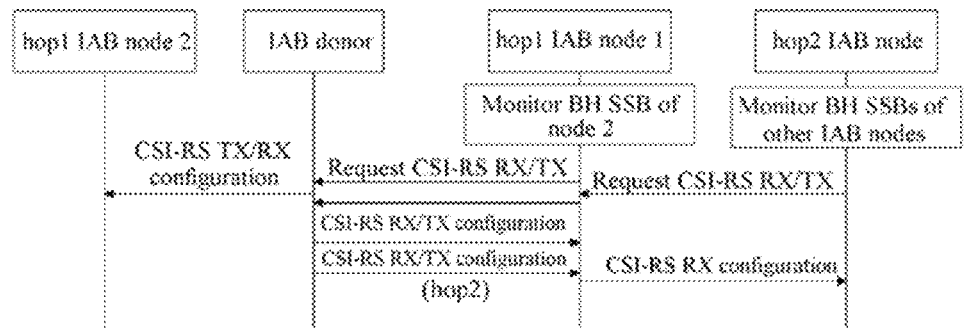
FIG. 24 shows an exemplary process of a configuration of a CSI-RS.

The IAB node monitors a surrounding candidate IAB node based on a SSB signal, and reports to the donor node, as shown in FIG. 24. On the one hand, the donor node indicates resources for receiving and transmitting a CSI-RS to the IAB node 1, and on the other hand, the donor node indicates resources for receiving and transmitting a CSI-RS to the IAB node 2.

The configured time-frequency resources may be scheduled periodically, non-periodically or semi-statically.

As an example, the fields that may be added to the CSI-RS reception configuration are shown in Table 1-3 below.

TABLE 1-3

| Field | Value and description |
| --- | --- |
| BH CSI-RS resource type (child node) | {non-periodic, semi-static, periodic} |
| BH CSI-measConfig (child node) | Bit string, resources for monitoring a CSI-RS by a IAB node |
| BH CSI-RS TX sresource | Bit string, direction and time-frequency resources for transmitting a CSI-RS by a IAB node |

In addition, the donor node may also indicate, to the corresponding relay node, time-frequency resources and direction information for transmitting a CSI-RS.

In addition, the relay node may configure parameter information of a directional beam based on direction information related to a surrounding candidate node which is detected by the relay node and report the configured parameter information to the donor node.

Figure 25:
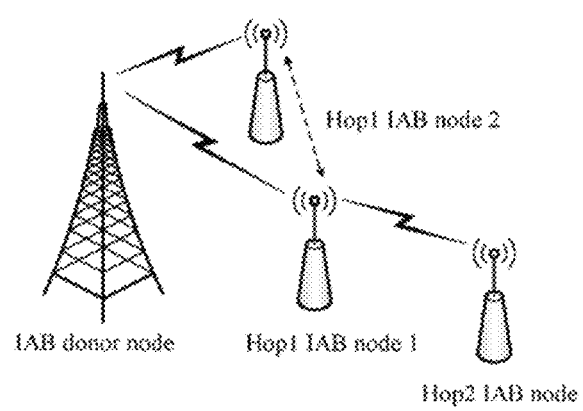
FIG. 25 shows an example of an IAB scenario.
Figure 26:
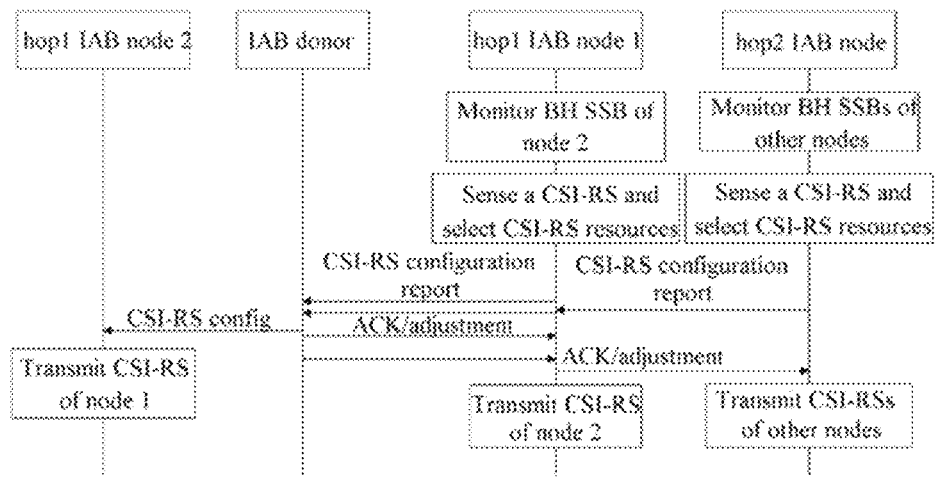
FIG. 26 shows an exemplary process of a configuration of a CSI-RS.

For example, the IAB node may monitor the surrounding candidate IAB node based on the SSB signal, configure a direction of the CSI-RS based on a direction of the SSB signal, and configure a transmission direction and time-frequency resources of directional beams of the CSI-RS based on remaining time resources of the CSI-RS, and report the time-frequency resources of the directional beams of the CSI-RS to the donor node. The donor node may review and adjust, and configure positions of the time-frequency resources for CSI-RS reception. Then, the IAB node may transmit the CSI-RS on the configured resources. The exemplary scenario and process are shown in FIG. 25 and FIG. 26.

For example, the fields newly added in a CSI-RS configuration report are shown in Table 1-4 below.

TABLE 1-4

| Field | Value and description |
|---|---|
| BH CSI-RS-ResourceSetList (child node) | Bit string, resources for transmitting a CSI-RS |

An exemplary manner in which a CSI-RS is transmitted using a directional beam is described above. Furthermore, according to an embodiment, a CSI-RS for a backhaul link may be transmitted in a omnidirectional mode, and orthogonal time-frequency resources are used for the CSI-RS for the access link and the CSI-RS for the backhaul link.

For example, a part of CSI-RS resources may be fixed to be dedicated to an AC CSI-RS, and the remaining CSI-RS resources may be allocated based on a link quality of the UE. An available AC CSI-RS reception group may be broadcast through broadcast information, or may be indicated to the UE through special high level signaling. Similarly, the allocated BH CSI-RS reception group may be configured for child nodes through broadcast information, and may be also indicated to the IAB node through special high level signaling. Two CSI-RS configuration manners, that is, a centralized configuration manner and a distributed configuration manner, may be used.

Correspondingly, according to an embodiment, the donor node configures the CSI-RS time-frequency resources for the relay node based on physical position information of the relay node and a connection relationship among the relay nodes.

Figure 27:
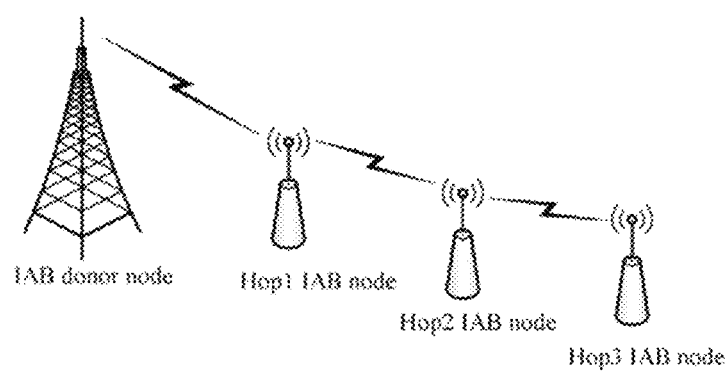
FIG. 27 shows an example of an IAB scenario.
Figure 28:
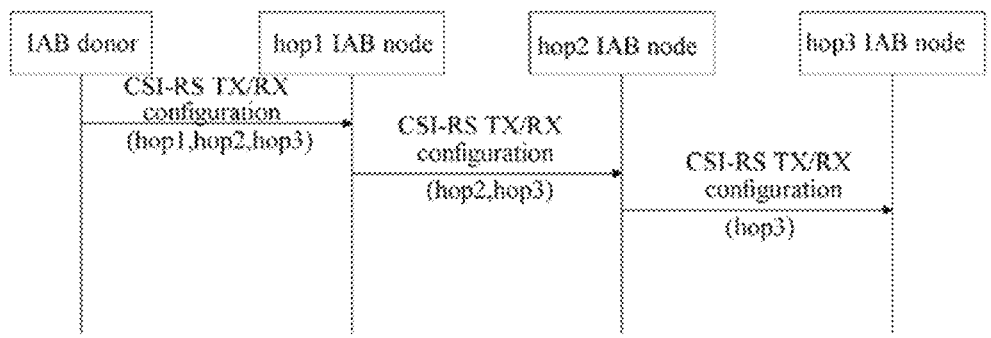
FIG. 28 shows an exemplary process of a configuration of a CSI-RS.

More specifically, the donor node may configure time resources for CSI-RS reception and transmission for the relay node based on geographic location information and a connection relationship for each relay node. An exemplary scenario and process are shown in FIG. 27 and FIG. 28. First, the donor node configures CSI-RS RX resources for hop1 IAB nodes, and then configures the remaining BH CSI-RS time resources for the hop1 IAB nodes. First, the donor node configures hop1 IAB nodes with a connection relationship and a neighbor relationship to ensure that the CSI-RSs for the hop1 IAB nodes are orthogonal in time. The configuration may include BH CSI-RS transmission and BH CSI-RS reception (monitoring the IAB nodes of the same hop). Then, the donor node configures CSI-RS transmission time resources for an independent hop1 IAB node (the CSI-RS resources of any hop1 IAB node may be multiplexed). Then, based on the hop1 IAB node to which a hop2 IAB node is connected, the donor node configures CSI-RS reception time resources for the hop2 IAB node. Then, it configures CSI-RS transmission resources for the hop2 IAB nodes connected to each other, to ensure that the time resources are orthogonal, and also configures CSI-RS reception resources. Then, the donor node configures CSI-RS transmission resources for an independent hop2 IAB node. And so on, until all relay nodes are configured. The above process is repeated until all the relay nodes are configured.

The fields added in the CSI-RS transmission and reception configuration may be shown in Table 1-5 below.

TABLE 1-5

| Field | Value and description |
|---|---|
| BH CSI-RS resource type (child node) | {non-periodic, semi-static, periodic} |
| BH CSI-RS-ResourceSetList (child node) | Bit string, resources for transmitting a CSI-RS |

TABLE 1-5-continued

| Field | Value and description |
|---|---|
| BH CSI-measConfig (child node) | Bit string, Resources for monitoring a CSI-RS by a IAB node |

The centralized manner is described above. On the other hand, the relay node may configure time-frequency resources for a subordinate node of the relay node, and reports the configured time-frequency resources to the donor node.

Figure 29:
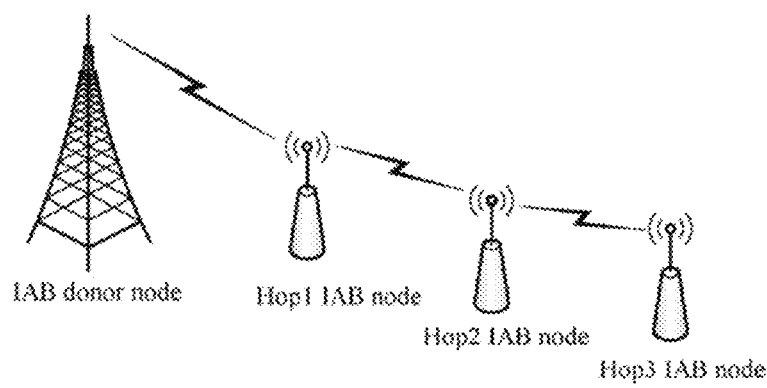
FIG. 29 shows an example of an IAB scenario.
Figure 30:
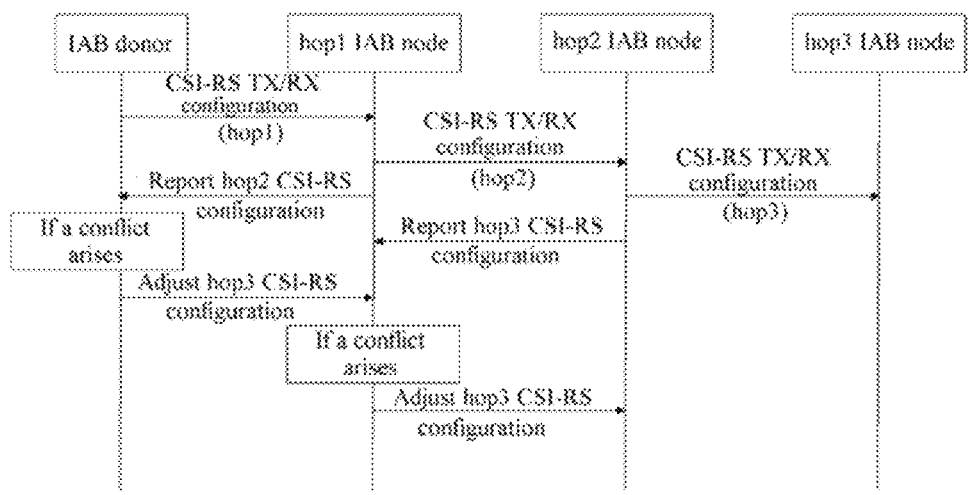
FIG. 30 shows an exemplary process of a configuration of a CSI-RS.

More specially, a parent node may configure CSI-RS reception time resources (for monitoring the parent node and other IAB nodes) and CSI-RS transmission time resources for its child node. Then, the child node configures CSI-RS transmission and reception resources for its own child nodes, to ensure that the CSI-RS time resources of those child nodes are orthogonal, and report to its parent node. It is assumed that all the parent nodes save all the CSI-RS configuration information of their child nodes and perform adjustment in a case that the parent nodes detect a CSI-RS detection conflict. An exemplary scenario and process are shown in FIG. 29 and FIG. 30.

The fields added in the CSI-RS transmission and reception configuration may be shown in Table 1-6 below.

TABLE 1-6

| Field | Value and description |
|---|---|
| BH CSI-RS resource type | {non-periodic, semi-static, periodic} |
| BH CSI-RS-ResourceSetList | Bit string, resources for transmitting a CSI-RS |
| BH CSI-measConfig | Bit string, Resources for monitoring a CSI-RS by a IAB node |

According to the above-described embodiments, it is possible to provide a BH SSB/CSI-RS resource configuration manner while ensuring access performances of a UE.

Figure 31:
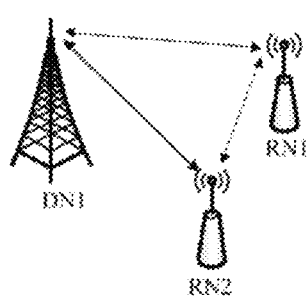
FIG. 31 is a schematic diagram illustrating a case in which transmission and reception for SSBs conflict between IAB nodes.
Figure 32:
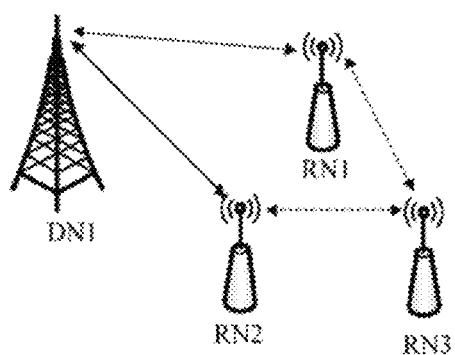
FIG. 32 is a schematic diagram illustrating a case of interferences between SSBs of IAB nodes.

Furthermore, due to a limitation of half-duplex, an IAB node may not simultaneously transmit a SSB signal and receive a SSB signal in a time slot. As shown in FIG. 31, if two adjacent IAB nodes (RN1 and RN2) transmit a SSB and receive a SSB in the same time, the RN1 and the RN2 may not monitor SSB signals from each other. Furthermore, as shown in FIG. 32, if the RN1 and the RN2 transmit SSB signals simultaneously, a RN3 may not accurately determine whether the SSB signal comes from RN1 or RN2.

In order to ensure that all IAB nodes may periodically monitor the surrounding candidate IAB nodes for potential usage, first, time resources for transmitting a SSB by an IAB node and time resources for transmitting a SSB by an adjacent node should be orthogonal, and the IAB node configures a SSB reception group, so that it may periodically monitor as many surrounding candidate nodes as possible.

Correspondingly, according to an embodiment, configuration information related to the reference signal may include a multiplexing manner of transmission and/or reception for the SSB.

The multiplexing manner may include time resources for transmission of SSBs of adjacent nodes being orthogonal.

For example, the above multiplexing manner may be determined in the following manner: configuring, by the donor node, time resources for transmission of the SSB of the relay node based on physical position information of the relay node and a connection relationship among the relay nodes; configuring, by the relay node, the time resources for a subordinate node of the relay node, and reporting, by the relay node, the configured time resources to the donor node; or detecting, by the relay node, a SSB transmitted by a surrounding node based on a hop count of the relay node, configuring, by the relay node, the time resources for itself based on a detection result, and reporting, by the relay node, the configured time resources to the donor node.

Hereinafter, the above three manners will be described with reference to specific examples.

Figure 33:
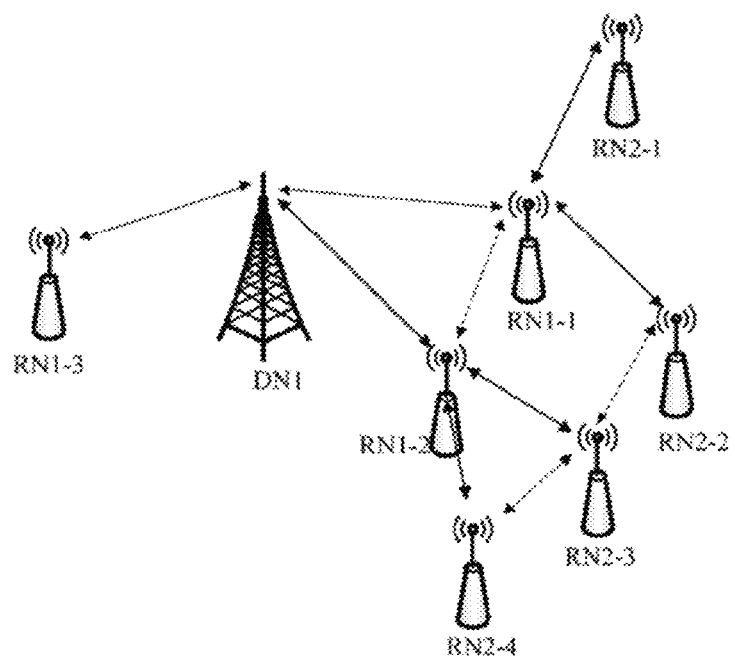
FIG. 33 shows an example of an IAB network deployment.
Figure 34:
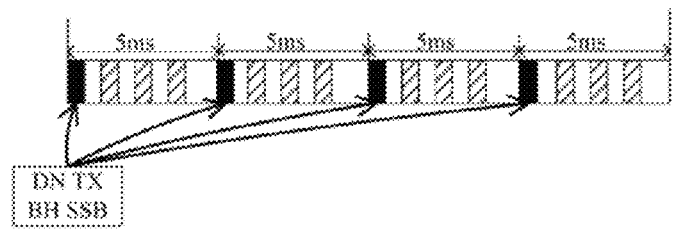
FIG. 34 to FIG. 39 show an example of an arrangement of a SSB for a backhaul link.
Figure 35:
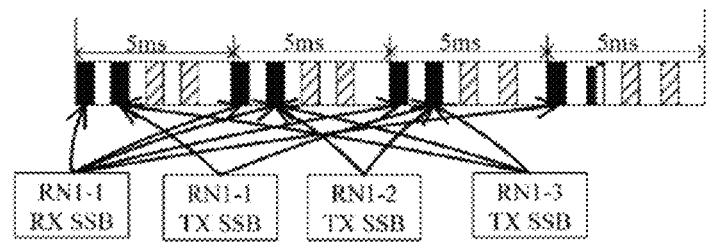
Figure 36:
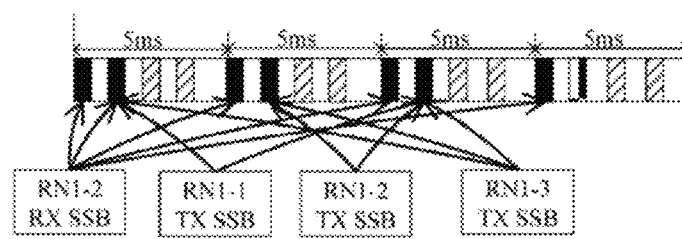
Figure 37:
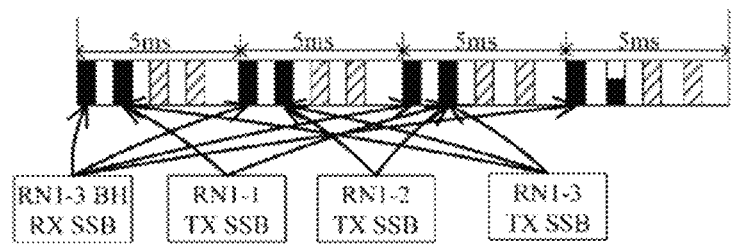
Figure 38:
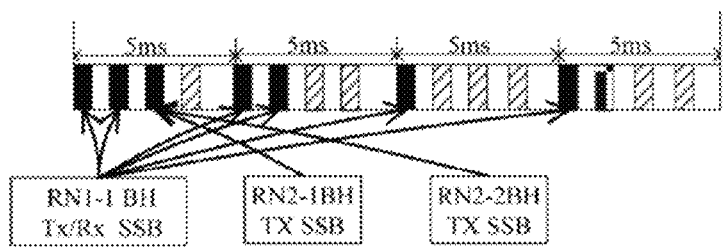
Figure 39:
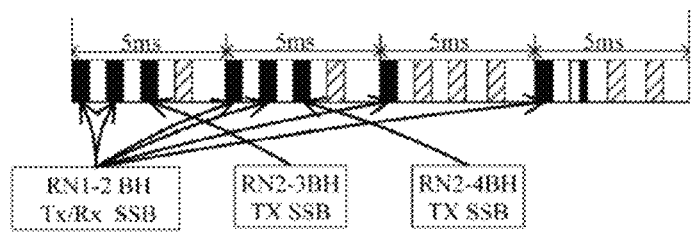
Figure 40:
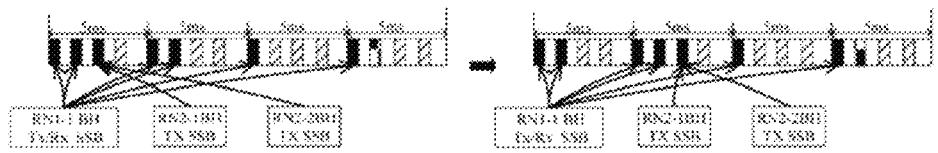
FIG. 40 shows an example of an adjustment of a SSB for a backhaul link.

First, an exemplary manner of the donor node performing centralized control on SSB configuration is illustrated. FIG. 33 shows an example of an IAB network deployment. FIG. 34 shows positions for transmission of SSB for a donor node DN. FIG. 35 shows positions for reception and transmission of a BH SSB for RN1-1. FIG. 36 shows positions for reception and transmission of a BH SSB for RN1-2. FIG. 37 shows positions for reception and transmission of a BH SSB for RN1-3. FIG. 38 shows positions for reception and transmission of a BH SSB for RN1-1 and child nodes. FIG. 39 shows positions for reception and transmission of a BH SSB for RN1-2 and child nodes. FIG. 40 shows a case in which positions for SSBs for RN2-2 and RN2-3 conflict.

The donor node may obtain, from a core network, geographic location information and interconnection information related to all the connected IAB nodes, including a hop count of an IAB node and a state of its connected IAB node(s). Resources positions for transmission and reception of SSBs for a backhaul link are centrally configured for the IAB nodes.

In a case that AC SSB positions and BH SSB positions have been allocated according to the above embodiment, the donor node may allocate BH SSBs to all the IAB nodes of the hop1. According to a multiplexing mode of SSBs, for example, in a case that there are an AC SSB and a BH SSB in each half-frame, a BH SSB position for the donor node may be fixed. As shown in FIG. 34, a first position of each half-frame is configured as a BH SSB.

Then, the donor node may configure the hop1 IAB nodes. First, hop1 IAB nodes with a connection relationship (such as RN1-1 and RN1-2 in FIG. 33) are configured, and orthogonal resources are configured for them. As shown in FIG. 35, in second, SSB TX positions of different half-frames, TX/RX positions of RN1-1 and RN1-2 may not be orthogonal, while RN1-1 and RN1-2 and RN1-3 may not monitor with each other, so that RN1-1 and RN1-2 may multiplexes resources of RN1-3 for SSB TX, alternatively, RN1-3 may multiplex BH SSB TXs of RN1-1 and RN1-2. RN1-1, RN1-2 and RN1-3 may select some of the DN BH SSB positions (for example, positions as indicated in FIG. 24) for monitoring.

RN1-1 may configure its child nodes (RN2-1 and RN2-2) based on its remaining SSB. RN1-2 may configure its child nodes (RN2-3 and RN2-4) based on its remaining SSB positions. It is possible that RN2-2 and RN2-3 are configured with the same resources (as shown in FIG. 38 and FIG. 39). DN1 centrally coordinates SSB positions of RN2-2 and RN2-3 during the configuration process, to avoid a conflict of transmission and reception (as shown in FIG. 40).

Figure 41:
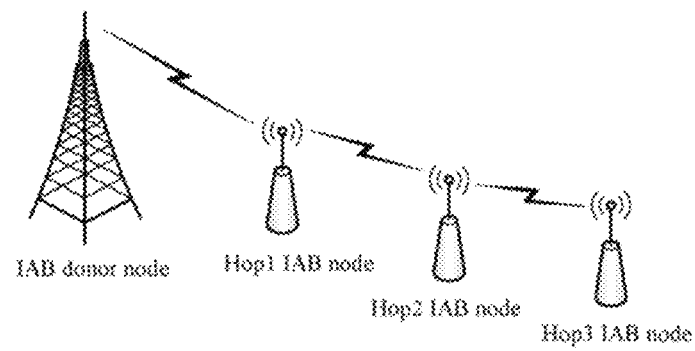
FIG. 41 shows an example of an IAB scenario.
Figure 42:
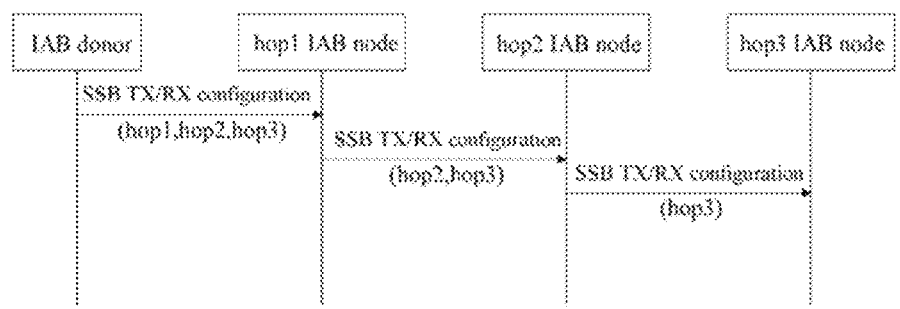
FIG. 42 shows an exemplary process of a configuration of a SSB.

An exemplary scenario and a process of the above configuration manner are shown in FIG. 41 and FIG. 42.

The fields added in a SSB transmission and reception configuration may be shown in Table 2-1 below.

TABLE 2-1

| Field | Value and description |
|---|---|
| BH SSB-MTC-periodicityAndOffset (including child nodes) | BIT STRING, a monitoring period and an offset value of a SSB signal (each in a unit of a sub-frame) |
| BH SSB-MTC-duration | Bit string, a duration of a measurement time window (in a unit of the number of sub-frames) |
| BH SSB-TX-period | Bit string, a transmission period of a SSB signal |
| BH SSB-TX-resource | Bit string, a sub-frame position for transmission of a SSB signal |

Next, an exemplary manner of configuring BH SSBs of IAB nodes in a stepwise manner is illustrated.

In this way, the BH SSB TX position of the donor node remains unchanged and the period is adjustable. In a case that the period is increased, other idle positions may be allocated to an AC SSB for a UE. The donor node configures a SSB TX/RX position for its child nodes, and a child node configures, based on its BH SSB TX/RX position, a BH SSB TX/RX for the next level node.

Nodes of each level of informs a configuration result to a parent node thereof. If finding a conflict, the parent node will adjust the SSB TX.

In addition, for nodes of each level, a time window may be configured to monitor all surrounding candidate IAB nodes. In a case that SSB positions conflict, the SSB TX may be adjusted by the node itself.

Figure 43:
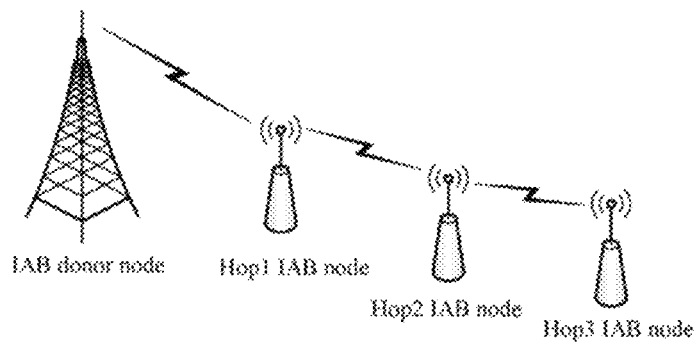
FIG. 43 shows an example of an IAB scenario.
Figure 44:
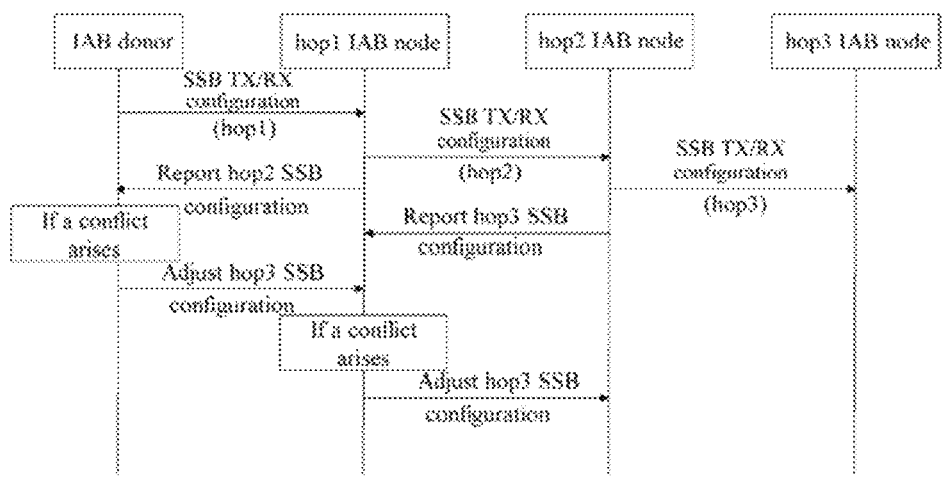
FIG. 44 shows an exemplary process of a configuration of a SSB.

An exemplary scenario and a process of the above configuration manner are shown in FIG. 43 and FIG. 44.

The fields added in the SSB TX/RX configuration may be the same as those shown in Table 2-1.

Next, an exemplary manner of configuration of BH SSB TX/RX by IAB nodes themselves in a distributed manner is illustrated.

An IAB node may determine a BH SSB position which it may use in a half-frame, based on a hop count where the IAB node is located. If the hop count is greater than the number of BH SSBs in a half-frame, a fixed SSB position in a half-frame may be occupied. Specifically, SSB signal detection may be performed first. If no SSB signal is configured at this position, the position may be configured as SSB TX, and some SSB signals may be selected for monitoring. After the BH SSB is configured, the remaining SSB positions may be allocated to AC SSB for a UE. The IAB node may report the configuration manner to the donor node. If there is a conflict, the donor node may perform adjustment.

Figure 45:
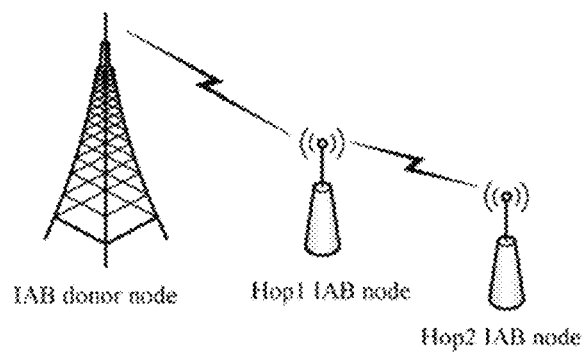
FIG. 45 shows an example of an IAB scenario.
Figure 46:
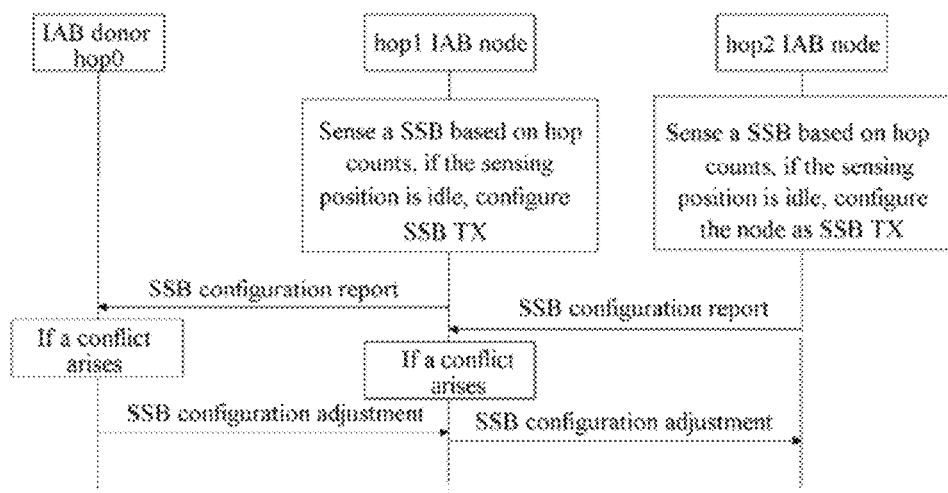
FIG. 46 shows an exemplary process of a configuration of a SSB.

An exemplary scenario and a process of the above configuration manner are shown in FIG. 45 and FIG. 46.

The fields added in a SSB configuration report and a SSB configuration adjustment may be shown in Table 2-2 below.

TABLE 2-2

| Field | Value and description |
|---|---|
| BH SSB-TX-period | Bit string, a transmission period of a SSB signal |
| BH SSB-TX-resource | Bit string, a sub-frame position for transmission of a SSB signal |

Figure 47:
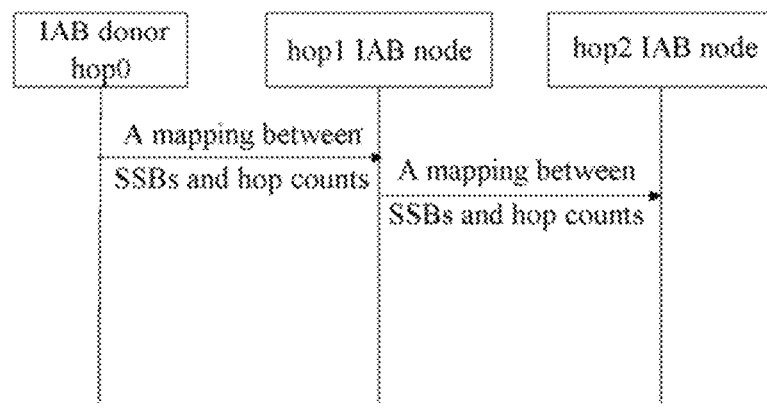
FIG. 47 shows an example of an IAB scenario.

FIG. 47 shows an exemplary process showing that a node configures a mapping relationship between a hop count and a SSB position for an IAB node.

The fields added in this process may be shown in Table 2-3 below.

TABLE 2-3

| Field | Value and description |
| --- | --- |
| Mapping of SSB and hop order | Bit string, a relationship between a SSB position in a half-frame and a hop count of the node (a specific hop count corresponding to a SSB resource in this configuration) |

Furthermore, according to an embodiment, in a case that a link quality of a backhaul link of the relay node is lower than a predetermined threshold, at least a part of the time resources for the transmission of the SSB may be adjusted to be used for reception for the SSB. The predetermined threshold may be configured by the donor node for the relay node.

In other words, in a case that the current route quality of the IAB node is lower than the threshold, the IAB node needs to increase SSB RX positions to detect more candidate IAB nodes or donor nodes. The configured TX SSB for the IAB node is muted to monitor other SSB positions, without affecting other IAB nodes.

Figure 48:
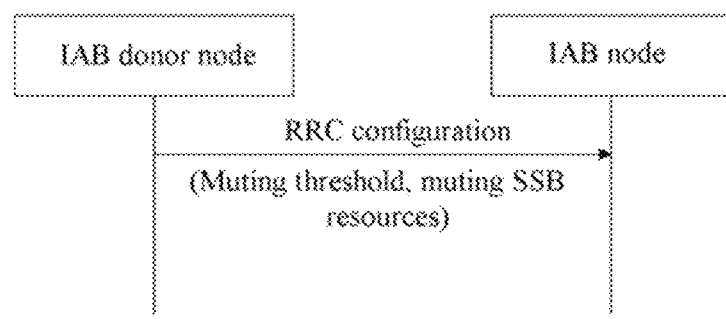
FIG. 48 shows an exemplary process of a configuration of SSB muting.

The exemplary process is shown in FIG. 48. The donor node configures, for its child nodes, SSB TX muting threshold conditions and resource positions of SSB TX. In a case that the threshold condition is satisfied, the IAB node will monitor at the SSB TX.

The fields that should be added in radio resource control (RRC) signaling are as shown in Table 2-4 below.

TABLE 2-4

| Field | Value and description |
| --- | --- |
| Muting threshold | Bit string, a link state threshold triggering muting |
| Muting BH SSB position | Bit string, a BH SSB position for which muting is performed |

Furthermore, in a case that the at least a part of the time resources is adjusted to be used for reception for the SSB, for an adjacent node of the relay node, corresponding time-frequency resources may be adjusted to be used for transmission for the SSB.

Figure 49:
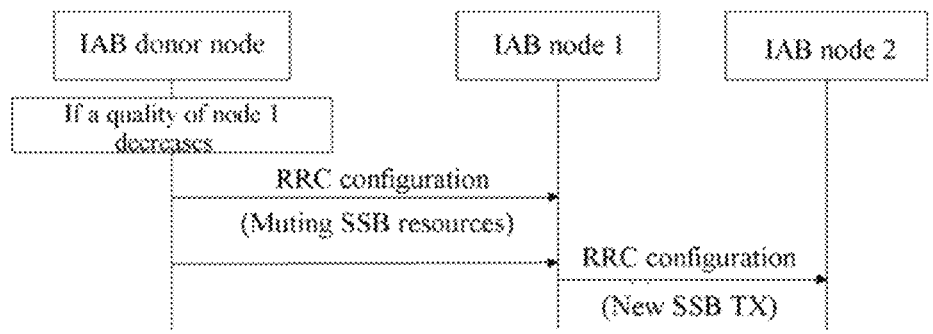
FIG. 49 shows another exemplary process of a configuration of SSB muting.

More specifically, the donor node may appropriately adjust SSB RX/TX positions of two adjacent IAB nodes based on a route quality of the IAB nodes and a load status of a cell. This process is shown in FIG. 49.

The fields newly added in RRC signaling may be similar to the field of Muting BH SSB position in Table 2-4.

In addition, the adjustment may be performed in the following manner: transmitting, in a case that the link quality of the backhaul link of the relay node is lower than a predetermined threshold, a request to the donor node by the relay node; and configuring, by the donor node, more time resources for reception of the SSB for the relay node based on the request.

Figure 50:
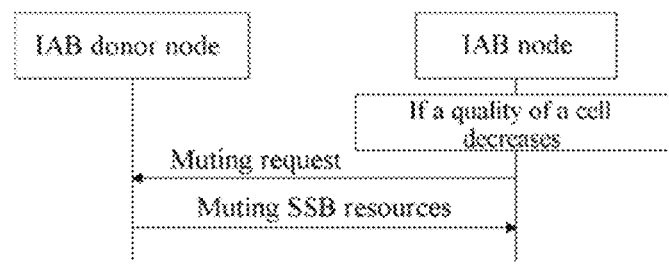
FIG. 50 shows yet another exemplary process of a configuration of SSB muting.

More specifically, in a case that a route quality of the IAB node is lower than the threshold, the IAB node may actively request to be configured with more SSB monitoring positions, and the donor node may indicate a SSB RX group based on configurations around the IAB node. This process is shown in FIG. 50.

The fields newly added in muting SSB resources may be similar to the field of Muting BH SSB position in Table 2-4.

According to the above embodiment, manners for configuring the SSBs/CSI-RSs of adjacent IAB nodes may be coordinated, such that the adjacent IAB nodes may discover each other.

Furthermore, in a case that the AC SSB positions and BH SSB positions of one IAB node are orthogonal to each other, and the BH SSB TX and BH SSB Rx of adjacent cells are coordinated with each other, since two adjacent IAB nodes have an overlapping coverage, UEs in the overlapping coverage may suffer an interference by SSB (AC SSB or BH SSB) signals from a neighboring cell.

Figure 51A:
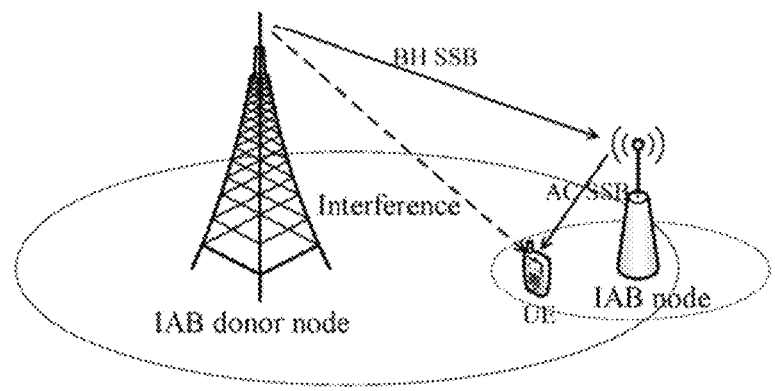
FIG. 51A and FIG. 51B are schematic diagrams illustrating an interference between IAB nodes.

More specifically, as shown in FIG. 51A, since a distance between an IAB donor node and an IAB node is far, a signal power of the BH SSB is large. If a main frequency band and a subcarrier frequency band used by the IAB donor node and the IAB node adopt the same mode, their SSB modes (patterns) are the same. In this case, the BH SSB of the IAB donor node and the AC SSB of the IAB node are transmitted in the same time, and the BH SSB will affect monitoring of the AC SSB by the UE.

Figure 51B:
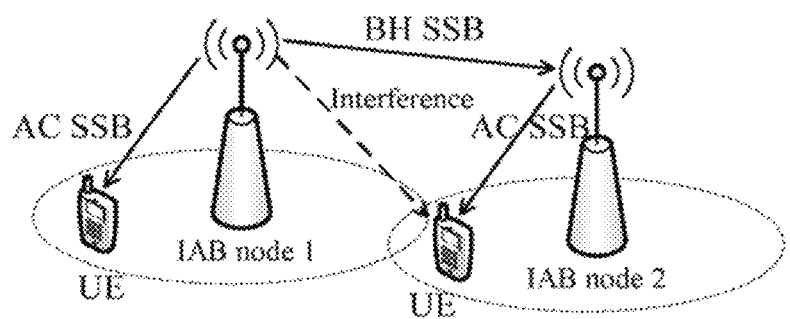

In addition, as shown in FIG. 51B, if an IAB node 1 and an IAB node 2 have the same main frequency and the same subcarrier interval, the IAB node 1 transmits a BH SSB and the IAB node 2 transmits an AC SSB on the same time-frequency resources. Since the power of the BH SSB is relatively large, the BH SSB will influence the AC SSB.

In view of the above problems, according to an embodiment, the configuration information of the reference signal may include a manner of transmitting a SSB for an access link and a SSB for a backhaul link by an adjacent node. The manner may include: transmitting, by the adjacent node, the SSB for the access link and the SSB for the backhaul link through orthogonal time resources.

More specifically, if two adjacent IAB nodes have the same main frequency resources or the same subcarrier bandwidths, the BH and AC SSBs transmitted by the two IAB nodes are orthogonal. The BH SSB positions of a parent IAB node may not be used to transmit the AC SSB by the child IAB node.

Figure 52:
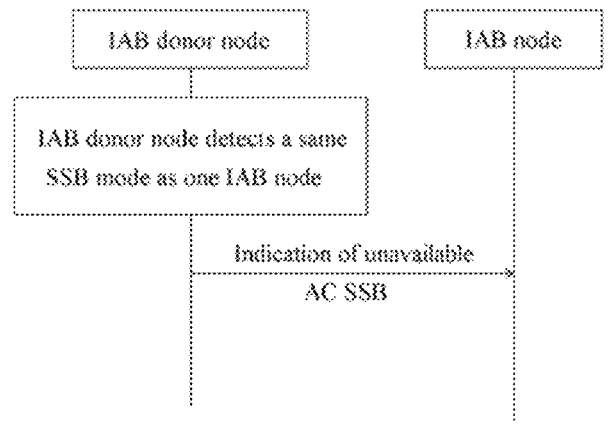
FIG. 52 to FIG. 54 show an exemplary process of a coordination between IAB nodes.
Figure 53:
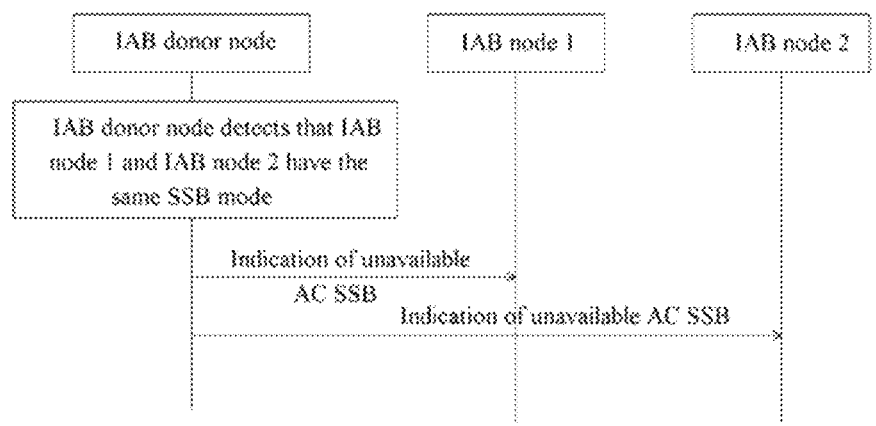

The configuration process is shown in FIG. 52 and FIG. 53. In a manner shown in FIG. 52, an IAB donor node directly indicates positions where the surrounding IAB nodes may not transmit an AC SSB. In a manner shown in FIG. 53, an IAB donor node directly indicates positions where IAB node 1 and IAB node 2 may not transmit an AC SSB.

The fields newly added in an indication of unavailable AC SSBs are as shown in Table 3-1 below.

TABLE 3-1

| Field | Value and description |
| --- | --- |
| UnavailableACSSB | Bit string, indicating AC SSB resources that an IAB node may not configure |

According to another embodiment, a manner of transmitting a SSB for an access link and a SSB for a backhaul link by an adjacent node includes: transmitting, by the adjacent node, the SSB for the backhaul link using a directional beam.

Since the position of the IAB node is fixed, a directional beam may be introduced to transmit a SSB. In addition, a UE within the beam direction range may be configured not to monitor a SSB on time-frequency resources of the BH SSB.

Figure 54:
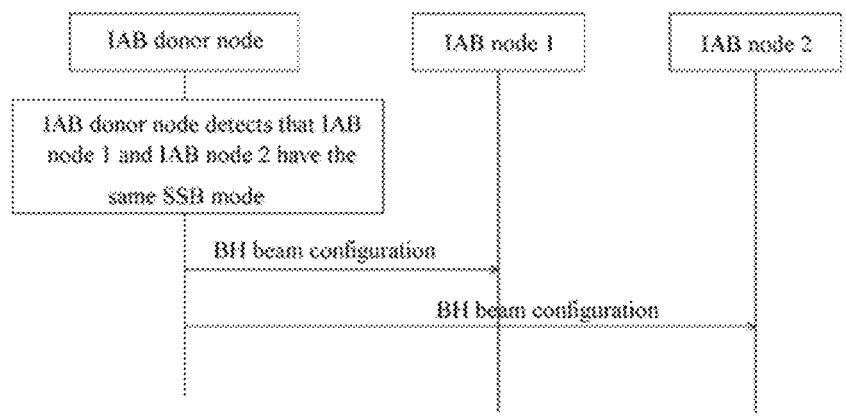

As shown in FIG. 54, when an IAB donor node detects that IAB node 1 and IAB node 2 have the same SSB mode, the IAB donor node may indicate the IAB node to transmit a SSB signal using the directional beam.

The fields newly added for a BH directional beam are shown in Table 3-2 below.

TABLE 3-2

| Field | Value and description |
|---|---|
| BH-SSB-Finerbeam-TXresource | Bit string, transmission time-frequency resources of a SSB directional beam |
| BH-SSB-Finerbeam-RXresource | Bit string, reception time-frequency resources of a SSB directional beam |
| BH-SSB-Finerbeam-TXdirection | Bit string, transmission direction configuration of a SSB directional beam |
| BH-SSB-Finerbeam-period | Bit string, SSB period configuration |

In the above embodiment, by parameter configuration, it is possible to coordinate to ensure that the UE is not interfered by a BH SSB of the neighboring IAB.

Furthermore, in a case that an IAB node receives a SSB signal or a CSI-RS signal, according to the existing cell access solution, a problem may occur that a latency of a selected cell (due to too many hop counts) may not meet the requirements or the load of the selected cell is increased.

Figure 55:
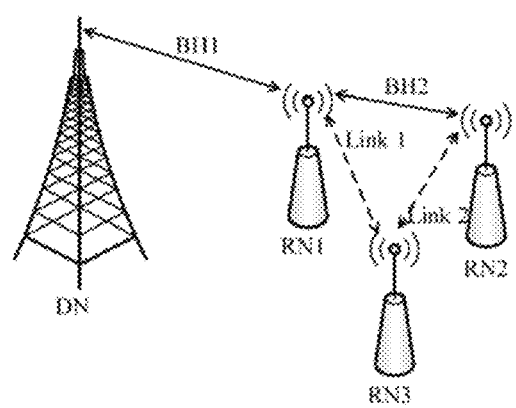
FIG. 55 is a schematic diagram illustrating a scenario of an IAB link reselection.

Specifically, a manner that the UE performs cell access is as follows. Based on signal strength of a link, a cell with the strongest signal strength is selected for access. In a case that the current link quality is lower than a threshold, a cell with the best link quality is selected to switch. In a case that the IAB node performs cell selection or route reselection, if the route selection is performed only based on the link quality, it may cause a large transmission latency of the selected route, a heavy cell load or a low data rate of the route, resulting in re-switching of the IAB node or performance degradation. For example, as shown in FIG. 55, if a link quality is taken as the only factor, RN3 may select RN2 to connect, rather than selecting RN1 with a small hop count, which may cause a large link transmission latency. In order to improve performance and quality of the route reselection performed by the IAB node, a solution for link reselection of the IAB node is provided according to the following embodiments.

Figure 2:
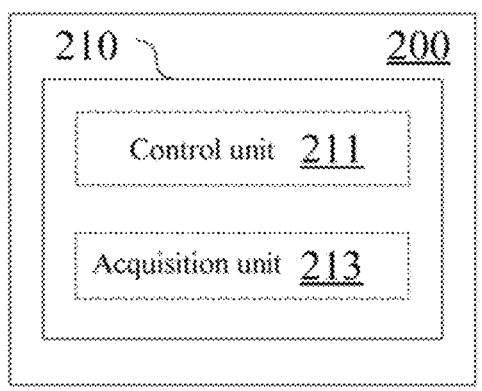
FIG. 2 is a block diagram showing a configuration example of an electronic device for wireless communication according to another embodiment of the present disclosure.

As shown in FIG. 2, an electronic device 200 for wireless communication according to an embodiment includes a processing circuitry 210. The processing circuitry 210 includes a control unit 211 and an acquisition unit 213. A configuration of the control unit 211 is similar to that described in the above embodiment, which is not repeated here.

The acquisition unit 213 is configured to acquire hop count information indicating a relay hop count of a relay node from a donor node.

The hop count of an IAB node in an IAB topology may affect a selection and a reselection for other IAB nodes. A definition of hop count and an indication of the hop count in the network should also be considered. Because the number and hop counts of IAB nodes that an IAB donor node may connect are uncertain, it is reasonable to calculate the hop count of the IAB node from the IAB donor node. As the IAB nodes expand, the hop counts are gradually increased.

Regarding a manner of indicating hop counts, according to an embodiment, a relay hop count of a relay node which transmits a reference signal can be determined based on a predetermined correspondence between a resource position of the reference signal and the relay hop count. As described above, the reference signal may include, for example, a SSB and a CSI-RS. In addition, the reference signal used to determine hop counts may also include a system information block signal such as a MIB or a SIB (which is a broadcast signal). The above predetermined correspondence may be notified by the donor node to the relay node.

In this manner, hop count information is implicitly indicated. More specifically, there is a mapping between the hop count of the IAB node and the position for transmitting a BH SSB. When the IAB node 1 monitors a SSB signal from the IAB node 2, the IAB node 1 knows the hop count of the IAB node 2 based on the position of the SSB. If the IAB node 1 joins the IAB node 2, just 1 is added to the hop count of the IAB node 1, and then the IAB node 1 transmits a BH SSB at a SSB position corresponding to the hop count. It is assumed that the hop count of the IAB donor node is hop0, a hop count of an IAB node connected with the hop0 node (IAB donor node) is hop1, and a hop count of an IAB node connected with the hop1 node is hop2, and so on.

Figure 56:
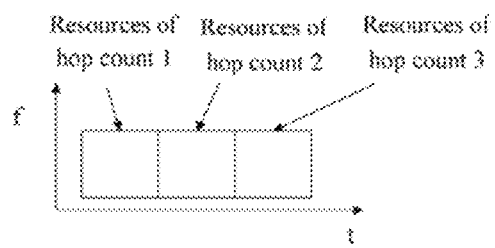
FIG. 56 shows an example of a correspondence between a hop count and reference signal resource.

As shown in FIG. 56, the hop count information is implicitly indicated to a child IAB node by discovering resource positions of a signal, or resource positions of the synchronization signal, or resource positions of a MIB/SIB signal. The UE or the child IAB node obtains the hop count information based on the resource positions of the received signal. The resource position information may be configured by the IAB donor node, and the mapping list (signal resource and hop count) is transmitted to the child IAB node.

Table 4-1 shows an example of a mapping list of signal resources and hop counts.

TABLE 4-1

| Hop count | Resource |
|---|---|
| Hop count 1 | Resource group 1 |
| Hop count 2 | Resource group 1 |
| . . . | . . . |

According to another embodiment, the acquisition unit 213 may also be configured to acquire the hop count from master system information blocks, radio resource control signaling or the reference signal transmitted by a node.

In other words, hop count information may be indicated explicitly.

More specifically, the hop count information of the IAB node may be stored in MIB information, and the IAB node may obtain the hop count of the connected IAB node by monitoring the MIB information of the connected IAB node.

Examples of the fields that should be added in the MIB are shown in Table 4-2 below.

TABLE 4-2

| Field | Value and description |
|---|---|
| hop-order | Bit string (length of 3 to 4), a hop count of an IAB node |

Alternatively, the parent IAB node or the IAB donor node may indicate a hop count of a child IAB node by RRC signaling (the indication may be the hop count of the parent IAB node or the hop count of the child IAB node).

Examples of the fields that should be added in RRCReconfiguration are shown in Table 4-3 below.

TABLE 4-3

| Field | Value and description |
|---|---|
| hop-order | Bit string (length of 3 to 4), a hop count of an IAB node |

Alternatively, the parent IAB node or the IAB donor node may indicate information of its hop by a discovery signal (SSB signal or CSI-RS signal), such that the IAB may select an appropriate parent IAB node or IAB donor node based on the discovery signal.

Examples of the fields that should be added in the discovery signal are shown in Table 4-4 below.

TABLE 4-4

| Field | Value and description |
|---|---|
| hop-order | Bit string (length of 3 to 4), a hop count of an IAB node |

Furthermore, according to an embodiment, reselection of a backhaul link may also be performed based on the hop count information.

Figure 3:
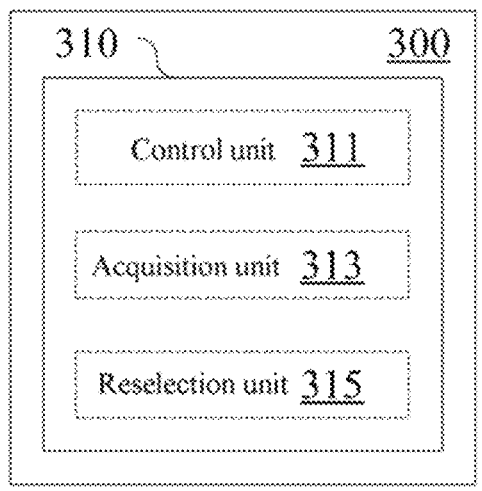
FIG. 3 is a block diagram showing a configuration example of an electronic device for wireless communication according to another embodiment of the present disclosure.

As shown in FIG. 3, an electronic device 300 for wireless communication according to an embodiment includes a processing circuitry 310. The processing circuitry 310 includes a control unit 311, an acquisition unit 313 and a reselection unit 315. Configurations of the control unit 311 and the acquisition unit 313 are similar to that described in the above embodiment, which are not repeated here.

The reselection unit 315 is configured to perform reselection of a backhaul link based on the following conditions: hop counts of a current connection node and a candidate connection code; and/or link qualities of a current connection node and a candidate connection node.

More specifically, the reselection unit 315 may be configured to determine, in a case that a condition of the candidate connection node is better than that of the current connection node, to switch to the candidate connection node.

Figure 57:
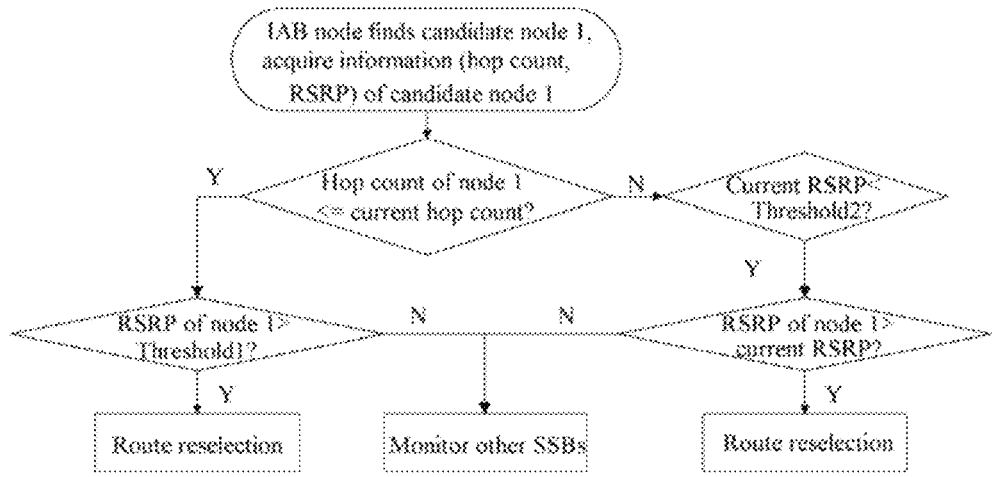
FIG. 57 and FIG. 58 show process examples of a link reselection.

According to the present embodiment, the IAB node performs switching once a suitable link is detected. As shown in FIG. 57, the IAB node obtains a link quality and a hop count of a candidate IAB node based on a SSB signal. First, it may be determined whether the hop count is greater than the current hop count; if not, it is determined whether the link quality is better than the current link quality. If the link quality is better than the current link quality, a link reselection is performed. If the measured link quality is not better than the current link quality, the current link is maintained and monitoring of candidate IAB nodes is continued. If the hop count of the candidate node is greater than the hop count of the current node, it is determined whether the current link quality is less than a certain threshold (a need to switch urgently). If the current link quality is less than the current threshold, the link quality of the candidate node is compared with the link quality of the current node. If the link quality of the candidate node is greater than the link quality of the current node, the switching is performed. The threshold condition of link quality may be configured by the parent IAB node or may be configured by the IAB node itself.

Figure 58:
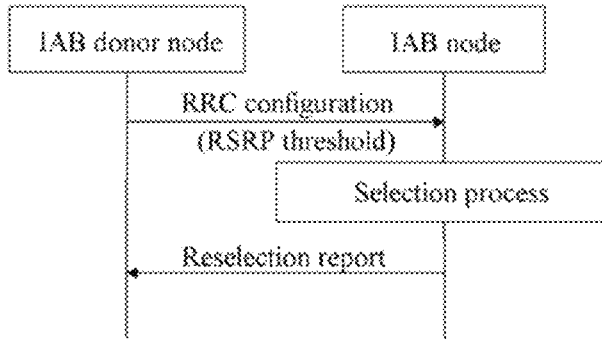

FIG. 58 shows a signaling flow of this exemplary manner. In this example, the threshold condition is configured by the donor node or the parent IAB node.

Correspondingly, the newly added RRC fields may be as shown in Table 4-5.

TABLE 4-5

| Field | Value and description |
|---|---|
| threshold1 | Bit string, used for a case that a hop count of a selected IAB node is less than or equal to a hop count of the current parent IAB node, if a link quality of the selected IAB node is greater than the threshold, a route reselection is performed |

TABLE 4-5-continued

| Field | Value and description |
|---|---|
| threshold2 | Bit string, in a case that the current link quality is less than the threshold, it is determined whether an IAB node whose hop count is greater than a hop count of the current parent IAB node is selected |

Furthermore, the reselection unit 315 may also be configured to select a candidate connection node to be switched to, based on the conditions of multiple candidate connection nodes measured in a given time window.

Figure 59:
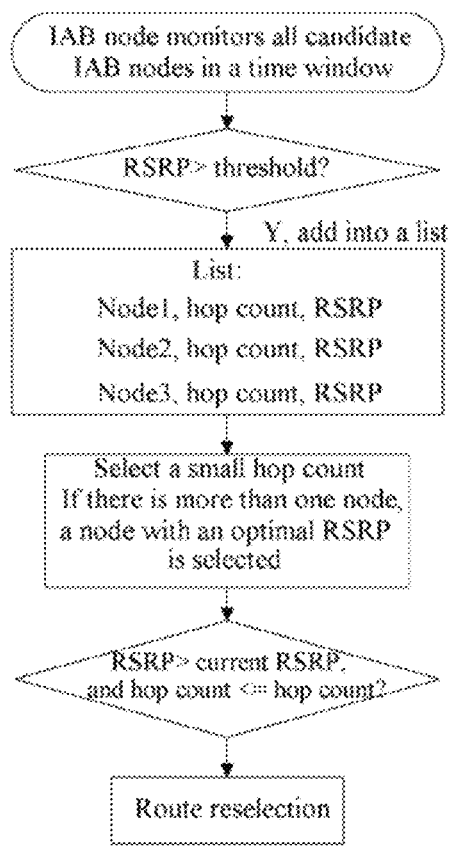
FIG. 59 and FIG. 60 show process examples of performing a link reselection based on multiple candidate links.

In other words, multiple candidate nodes are measured in a given time window, and an optimal node is selected for switching. As shown in FIG. 59, the IAB node obtains a link quality and a hop count of a candidate IAB node based on a SSB signal. In a case that the link quality of the IAB node is lower than a threshold, the IAB node initiates the time window and counts information of all candidate routes in the time window. An optimal route is found based on the relevant parameters. If the optimal link quality is greater than the current route quality, the switching is selected; otherwise, the current route is maintained. The threshold condition may be configured by the parent IAB node, or may be configured by the node itself. In a case that a measured link quality of a certain link is higher than the threshold, the node is added into a candidate node list (as shown in Table 4-6 below), and the list information may be updated periodically, to avoid keeping a node whose link quality gets worse in the candidate list.

TABLE 4-6

| ID of candidate node | Hop count | RSRP (reference signal received power) |
|---|---|---|
| Node 1 | | |
| Node 2 | | |
| . . . | | |

Figure 60:
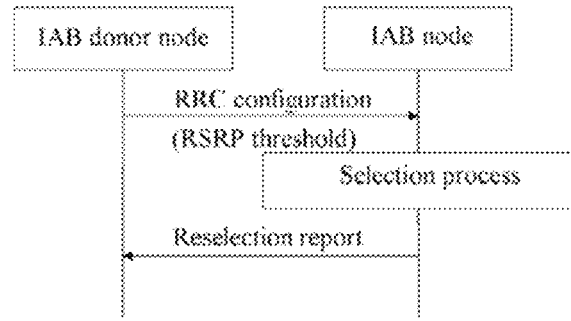

FIG. 60 shows a signaling flow of this exemplary manner. In this example, the threshold condition is configured by the donor node or the parent IAB node.

Correspondingly, the newly added RRC fields may be as shown in Table 4-7.

TABLE 4-7

| Field | Value and description |
|---|---|
| Threshold | Bit string, in a case that RSRP is greater than this threshold, it is determined that an optimal link is selected from the list |

Furthermore, the reselection unit 315 may also be configured to report the conditions of the multiple candidate connection nodes measured in a given time window to the donor node, and the donor node may select a candidate connection node to be switched to.

Figure 61:
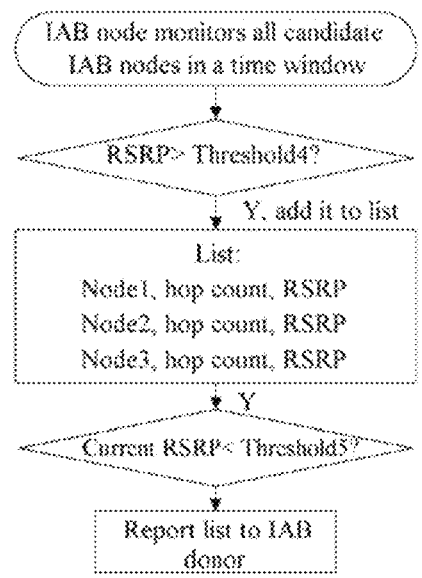
FIG. 61 and FIG. 62 show process examples of a link reselection assisted by a donor node.

In other words, the switching may be assisted by the IAB donor node. As shown in FIG. 61, the IAB node informs the IAB donor node of information of all candidate IAB nodes, and the IAB donor node assists the IAB node in determining which candidate cell to be switched to. In order to reduce signaling overhead of the IAB node for reporting candidate BHs to the IAB donor node, the IAB node may measure a link quality of a candidate node. In a case that the measured link quality is greater than the threshold, the candidate node is added in the candidate node list.

A threshold condition of the link quality of the current route may be set. In a case that the current link quality is lower than a certain threshold, the IAB node reports a candidate link set and the measured link quality to the IAB donor node. The IAB donor node indicates the IAB node whether to perform a switching process or which link is to be selected for switching, and transmits context information of the IAB node to the selected candidate IAB node, to assist a route reselection of the IAB node. The threshold condition may be configured by the parent IAB node or may be configured by the IAB node itself. In a case that a measured link quality of a certain link is higher than the threshold, the node may be added into the candidate node list, and the list information may be updated periodically, to avoid keeping a link whose quality gets worse in the candidate list.

Figure 62:
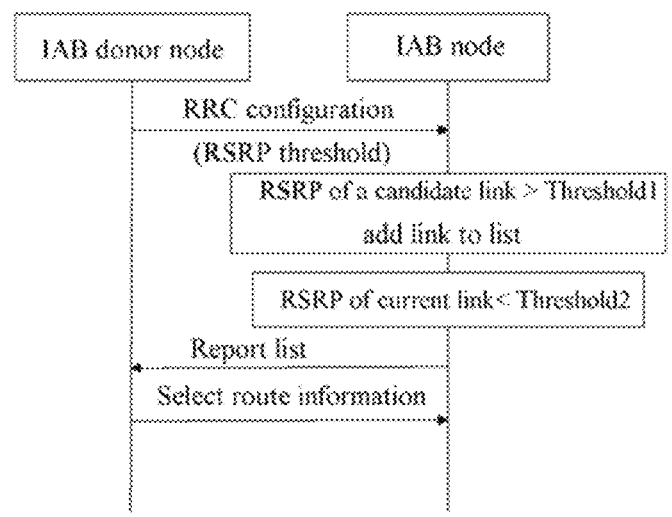

FIG. 62 shows a signaling flow of this exemplary manner. In this example, the threshold condition is configured by the donor node or the parent IAB node.

Correspondingly, the newly added RRC fields may be as shown in Table 4-8.

TABLE 4-8

| Field | Value and description |
| --- | --- |
| Threshold3 | Bit string, in a case that a measured RSRP of a candidate link is greater than this threshold, the candidate link is added into a candidate link list |
| Threshold4 | Bit string, in a case that the current link quality RSRP is less than this threshold, candidate link information is reported to IAB donor node |

With a manner and configuration for the link selection according to the above embodiment, a more efficient and high-quality IAB link reselection manner can be provided.

Furthermore, as the hop counts of network increase, synchronization errors will accumulate as the topology structure expands, and there is a higher requirement of synchronization accuracy of each link. According to the existing synchronization method based on a timing advance (TA), it is difficult to meet the requirement of synchronization accuracy. Thus, the embodiments described below relate to a solution for improving synchronization accuracy.

Figure 4:
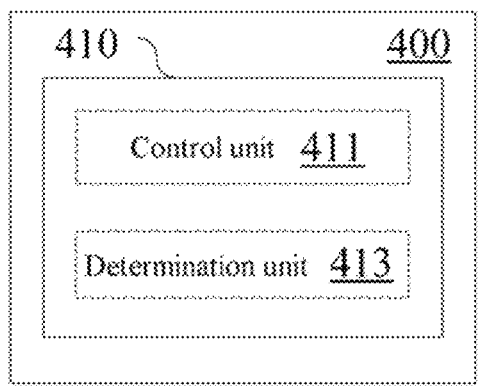
FIG. 4 is a block diagram showing a configuration example of an electronic device for wireless communication according to still another embodiment of the present disclosure.

As shown in FIG. 4, an electronic device 400 for wireless communication according to an embodiment includes a processing circuitry 410. The processing circuitry 410 includes a control unit 411 and a determination unit 413. A configuration of the control unit 411 is similar to that described in the above embodiment, which is not repeated here.

The determination unit 413 is configured to determine, based on a time offset between signals of different nodes connected via a backhaul link, an adjustment of synchronization time for at least one node of the different nodes. The adjustment may include adjusting, in a case that the offset between a Synchronization Signal Block SSB for a superior node and a Synchronization Signal Block SSB for a subordinate node which are connected via a backhaul link exceeds a predetermined threshold, synchronization time for the subordinate node.

Figure 63:
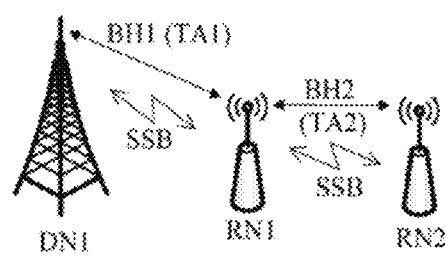
FIG. 63 and FIG. 64 are schematic diagrams illustrating a scenario of a synchronization measurement for a node.

Conventionally, a manner for a UE to obtain synchronization is to obtain a position of sub-frame 0 in a frame by monitoring a SSB signal. In FIG. 63, in an IAB multi-hop topology structure, both DN1 and RN1 need to transmit a BH SSB, and then, DN1 and RN1 may obtain a position of sub-frame #0 in a frame by monitoring BH SSB signals from each other. If an offset between the position of sub-frame #0 of one node and the detected sub-frame #0 of the other node is greater than a threshold, the child IAB node may readjust synchronization time, for example, by changing the TA value.

Furthermore, a configuration of the reference signal for a discovery of an IAB node may also be adjusted based on the synchronization situation.

Figure 5:
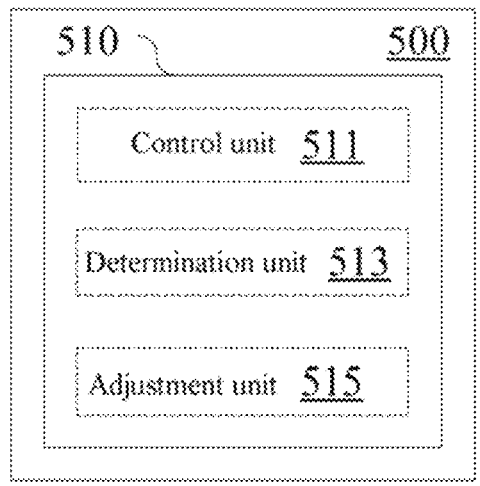
FIG. 5 is a block diagram showing a configuration example of an electronic device for wireless communication according to another embodiment of the present disclosure.

As shown in FIG. 5, an electronic device 500 for wireless communication according to an embodiment includes a processing circuitry 510. The processing circuitry 510 includes a control unit 511, a determination unit 513 and an adjustment unit 515. Configurations of the control unit 511 and the determination unit 513 are similar to those described in the above embodiment, which is not repeated here.

The adjustment unit 515 is configured to: in a case that the offset between the SSB for the superior node and the SSB for the subordinate node is greater than a predetermined upper limit, with respect to the subordinate node, reduce a monitoring period for the SSB or increase monitoring positions for the SSB.

Alternatively, the adjustment unit 515 may be configured to: in a case that the offset between the SSB for the superior node and the SSB for the subordinate node is lower than a predetermined lower limit, with respect to the subordinate node, increase a monitoring period for the SSB or reduce monitoring positions for the SSB.

For example, the parent IAB node may configure a period of monitoring the child BH SSB and a position of monitoring the SSB by itself based on the current timing accuracy. If the current accuracy is unstable and a large offset occurs, the period of monitoring the SSB may be reduced and the positions of monitoring the SSB may be increased. If the current accuracy of the SSB is stable and an offset value for each measurement is small, the period of monitoring the SSB may be increased and the positions of monitoring the SSB may be reduced.

An exemplary manner of bi-directional SSB monitoring and timing calculation is described above. Referring back to FIG. 4, according to an embodiment, the adjustment determined by the determination unit 413 may also include: adjusting, in a case that the offset between a Synchronization Signal Block SSB from a first node and a Synchronization Signal Block SSB from a third node which are received by a second node exceeds a predetermined threshold, synchronization time for the third node. The first node is a superior node for the second node, and the second node is a superior node for the third node.

Figure 64:
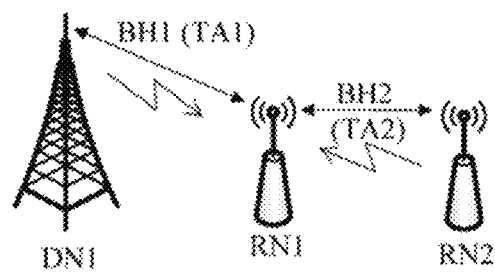

As shown in FIG. 64, RN1 receives data from DN1 and RN2 at the same time point. In a case that there is a time offset between data received from DN1 and data received from RN2, if the offset is greater than a certain threshold, RN1 readjusts RN2 to synchronize RN2 with DN1.

Furthermore, in a case that the offset is greater than the threshold, first, RN1 may determine an alignment with the parent IAB node, then adjusts its own time position for a SSB, and then adjusts a synchronization time for the child BH. The threshold may be configured by RN1 itself.

In addition, the second node may also adjust a transition gap between an uplink and a downlink (UL-DL transition gap) based on the above offset. The transition gap may be configured by the donor node or may be configured by a superior node for the second node. This transition gap may also be referred to as receiving-transmitting switching time or gap (RX TX switching time/gap). For a time division duplex (TDD) frame, the Tx/Rx gap (TTG) and an Rx/Tx gap (RTG) are set between a downlink burst (DL burst) and an uplink burst (UL burst) to support a receiving-transmitting transition of a base station. For an IAB node, similar gaps may be set to ensure the receiving-transmitting transition between the relay nodes or the donor nodes. By adjusting the transition gap based on the synchronization offset, the receiving-transmitting transition of the IAB node can be ensured.

Reference is still made to FIG. 4, according to an embodiment, the determination unit 413 may determine an adjustment of synchronization time in the following manner: transmitting, by a first node, timing configuration to a second node connected with the first node via a backhaul link; transmitting, by the second node, a synchronization maintenance signal to the first node based on the timing configuration; and determining, by the first node, an adjustment of synchronization time for the first node or the second node based on the timing configuration and a timing for the synchronization maintenance signal.

Figure 65:
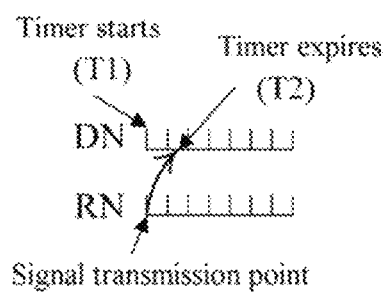
FIG. 65 is a schematic diagram illustrating a configuration example of a timing maintenance signal.

In the present embodiment, a timing maintenance signal is introduced for the backhaul link. As shown in FIG. 65, a new timing synchronization signal is introduced. In this way, the parent IAB node configures, for the child IAB node, a synchronization maintenance signal for time-frequency resource transmission, and the parent IAB node starts a timer at the corresponding time position. When the parent IAB node receives the synchronization maintenance signal, the timer is terminated and duration is calculated. An offset value between the duration and the previous value is compared with a threshold, and if the offset value is greater than the threshold, the TA is readjusted to provide synchronization accuracy.

Figure 66:
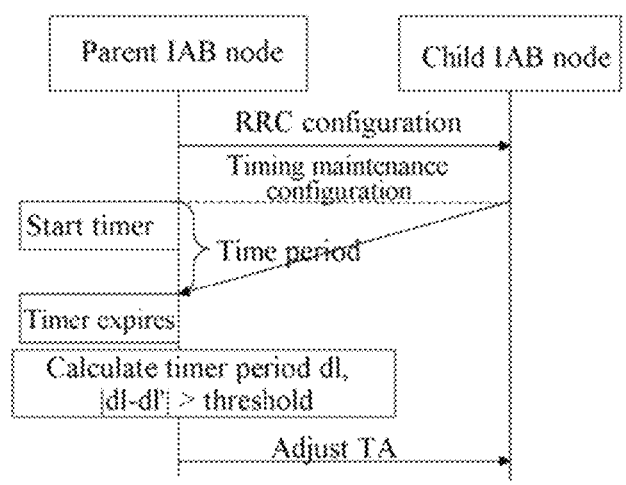
FIG. 66 shows an exemplary process of performing node synchronization using a timing maintenance signal.

FIG. 66 shows a signaling flow of this exemplary manner. The field of timing maintenance configuration may include time-frequency resources of the timing maintenance signal, a period of transmitting the timing maintenance signal, and a threshold for configuring and adjusting a TA.

Correspondingly, the newly added RRC fields may be as shown in Table 5.

TABLE 5

| Field | Value and description |
|---|---|
| Timing maintenance configuration | Bit string, indicating time-frequency resources and a period for transmitting the synchronization maintenance signal |

According to the above embodiment, more accurate synchronization between IAB nodes can be implemented.

In above descriptions of the device embodiments, it is apparent that some processes and methods are also disclosed. Next, a method for wireless communication according to an embodiment of the present disclosure is described without repeating the details described above.

Figure 6:
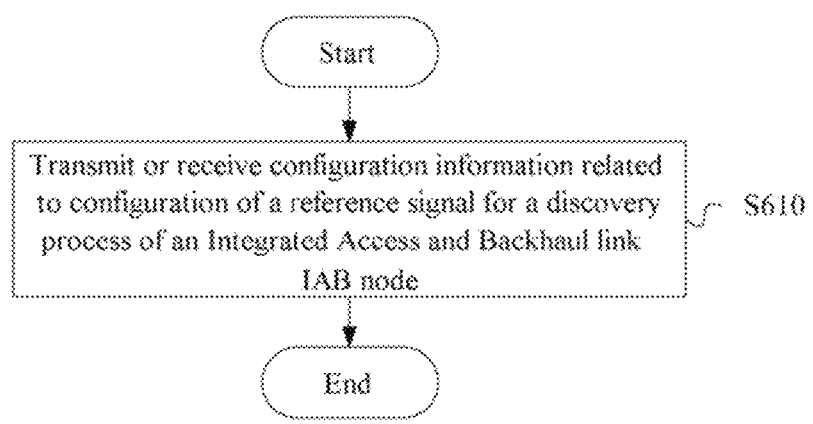
FIG. 6 is a flowchart showing a procedure example of a wireless communication method according to an embodiment of the present disclosure.

As shown in FIG. 6, a method for wireless communication according to an embodiment includes step S610 of transmitting or receiving configuration information related to configuration of a reference signal for a discovery process of an Integrated Access and Backhaul link IAB node.

Figure 7:
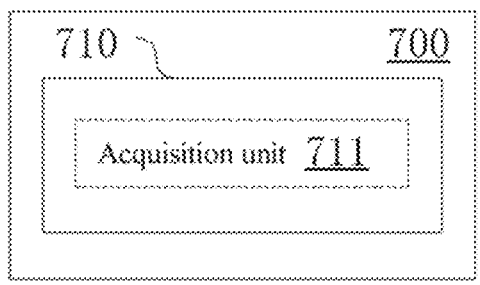
FIG. 7 is a block diagram showing a configuration example of an electronic device for wireless communication according to an embodiment of the present disclosure.

Furthermore, FIG. 7 shows a configuration example of an electronic device for wireless communication according to an embodiment. As shown in FIG. 7, the electronic device 700 includes a processing circuitry 710. The processing circuitry 710 includes an acquisition unit 711.

The acquisition unit 711 is configured to acquire hop count information indicating a relay hop count of a relay node from a donor node. The donor node is an IAB node which is in wired connection with a core network, and the relay node is an IAB node which is not in wired connection with the core network.

Acquiring the hop count information may include: determining, based on a predetermined correspondence between a time resource position of a SSB and a relay hop count, a hop count of a relay node that transmits the SSB.

Acquiring the hop count information may include: acquiring the hop count information from master system information blocks, radio resource control signaling or a reference signal for a discovery process of an IAB node transmitted by the relay node.

Figure 8:
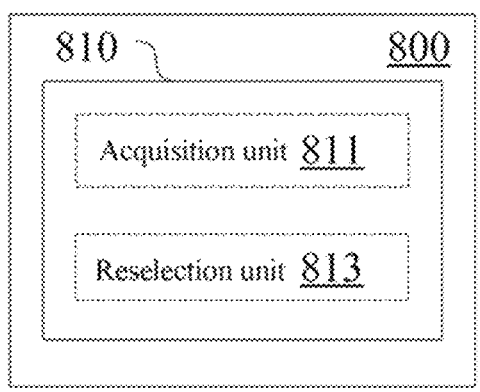
FIG. 8 is a block diagram showing a configuration example of an electronic device for wireless communication according to another embodiment.

FIG. 8 shows a configuration example of an electronic device for wireless communication according to another embodiment. As shown in FIG. 8, the electronic device 800 includes a processing circuitry 810. The processing circuitry 810 includes an acquisition unit 811 and a reselection unit 813. The acquisition unit 811 is similar to the acquisition unit 711 described above.

The reselection unit 813 is configured to perform reselection of a backhaul link based on hop counts of a current connection node and a candidate connection code; and/or link qualities of a current connection node and a candidate connection node.

More specially, the reselection unit 813 may be configured to: determine, in a case that a condition of the candidate connection node is better than that of the current connection node, to switch to the candidate connection node; select a candidate connection node to be switched to, based on the conditions of multiple candidate connection nodes measured in a given time window; or report the conditions of the multiple candidate connection nodes measured in a given time window to the donor node, and the donor node may select a candidate connection node to be switched to.

Figure 9:
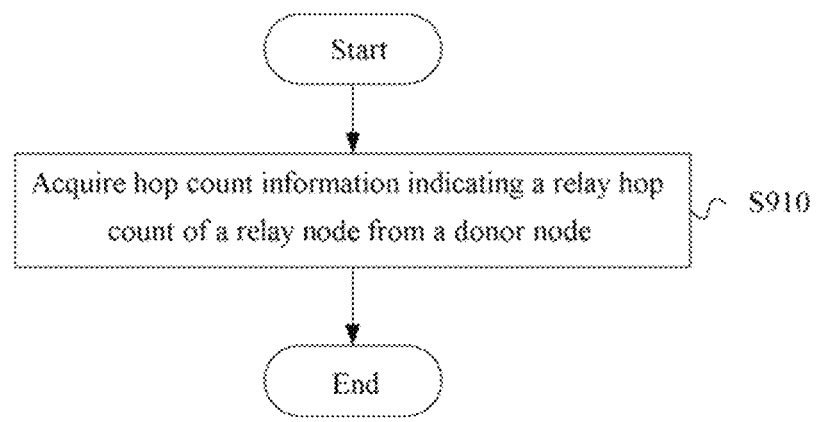
FIG. 9 is a flowchart showing a procedure example of a wireless communication method according to an embodiment of the present disclosure.

FIG. 9 shows a process example of the corresponding method for wireless communication. As shown in FIG. 9, a method for wireless communication includes step S910 of acquiring hop count information indicating a relay hop count of a relay node from a donor node. The donor node is an IAB node which is in wired connection with a core network, and the relay node is an IAB node which is not in wired connection with the core network.

Figure 10:
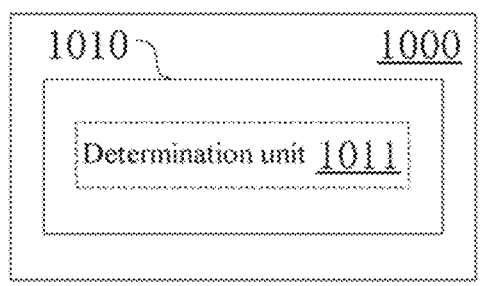
FIG. 10 is a block diagram showing a configuration example of an electronic device for wireless communication according to an embodiment of the present disclosure.

Furthermore, FIG. 10 shows a configuration example of an electronic device for wireless communication according to an embodiment. As shown in FIG. 10, the electronic device 1000 includes a processing circuitry 1010. The processing circuitry 1010 includes a determination unit 1011.

The determination unit 1011 is configured to determine, based on a time offset between signals of different nodes connected via a backhaul link, an adjustment of synchronization time for at least one node of the different nodes.

The adjustment may include adjusting, in a case that an offset between a SSB for a superior node and a SSB for a subordinate node which are connected via a backhaul link exceeds a predetermined threshold, synchronization time for the subordinate node.

The determination unit 1011 may determine the adjustment as: adjusting, in a case that an offset between a Synchronization Signal Block SSB from a first node and a Synchronization Signal Block SSB from a third node which are received by a second node is greater than a predetermined threshold, synchronization time for the third node. The first node, the second node and the third node are connected via a backhaul link, the first node is a superior node for the second node, and the second node is a superior node for the third node.

The determination unit 1011 may further determine the adjustment as: adjusting, by the second node, a transition gap between an uplink and a downlink based on the offset. The transition gap can be configured by a donor node or by a superior node for the second node.

The determination unit 1011 may be configured to determine the adjustment in the following manner: transmitting, by a first node, timing configuration to a second node connected with the first node via a backhaul link; transmitting, by the second node, a synchronization maintenance signal to the first node based on the timing configuration; and determining, by the first node, an adjustment of synchronization time for the first node or the second node based on the timing configuration and a timing for the synchronization maintenance signal.

Figure 11:
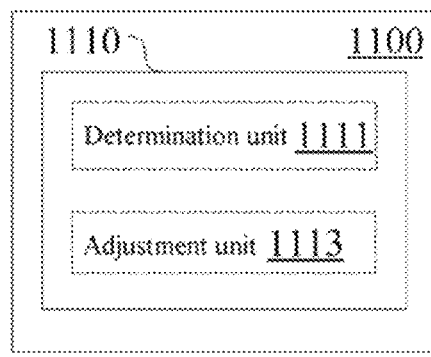
FIG. 11 is a block diagram showing a configuration example of an electronic device for wireless communication according to another embodiment of the present disclosure.

FIG. 11 shows a configuration example of an electronic device for wireless communication according to another embodiment. As shown in FIG. 11, an electronic device 1100 includes a processing circuitry 1110. The processing circuitry 1110 includes a determination unit 1111 and an adjustment unit 1113. The determination unit 1111 is similar to the determination unit 1011 described above.

The adjustment unit 1113 is configured to: in a case that an offset between the SSB for the superior node and the SSB for the subordinate node is greater than a predetermined upper limit, cause the subordinate node to reduce a monitoring period for the SSB or increase monitoring positions for the SSB; and/or in a case that an offset between the SSB for the superior node and the SSB for the subordinate node is lower than a predetermined lower limit, cause the subordinate node to increase a monitoring period for the SSB or reduce monitoring positions for the SSB.

Figure 12:
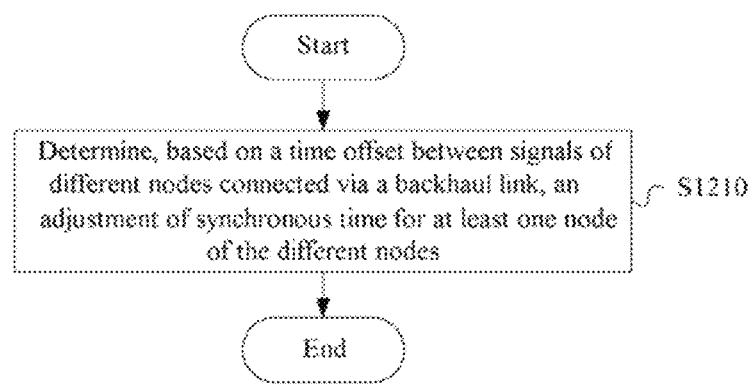
FIG. 12 is a flowchart showing a procedure example of a wireless communication method according to an embodiment of the present disclosure.

FIG. 12 shows a process example of the corresponding method for wireless communication. As shown in FIG. 12, a method for wireless communication includes step S1210 of determining, based on a time offset between signals of different nodes connected via a backhaul link, an adjustment of synchronization time for at least one node of the different nodes.

According to an embodiment of the present disclosure, a computer-readable medium is further provided. The computer-readable medium includes executable instructions which, when executed by an information processing apparatus, cause the information processing apparatus to implement the method according to the above embodiments.

As an example, various steps of the above methods and various modules and/or units of the above devices may be implemented by software, firmware, hardware, or a combination thereof. When implemented by software or firmware, a program constituting software for implementing the above method may be installed from a storage medium or a network to a computer (for example, a general-purpose computer 1300 shown in FIG. 13) having a dedicated hardware structure, which, when installed with various programs, may perform various functions and the like.

Figure 13:
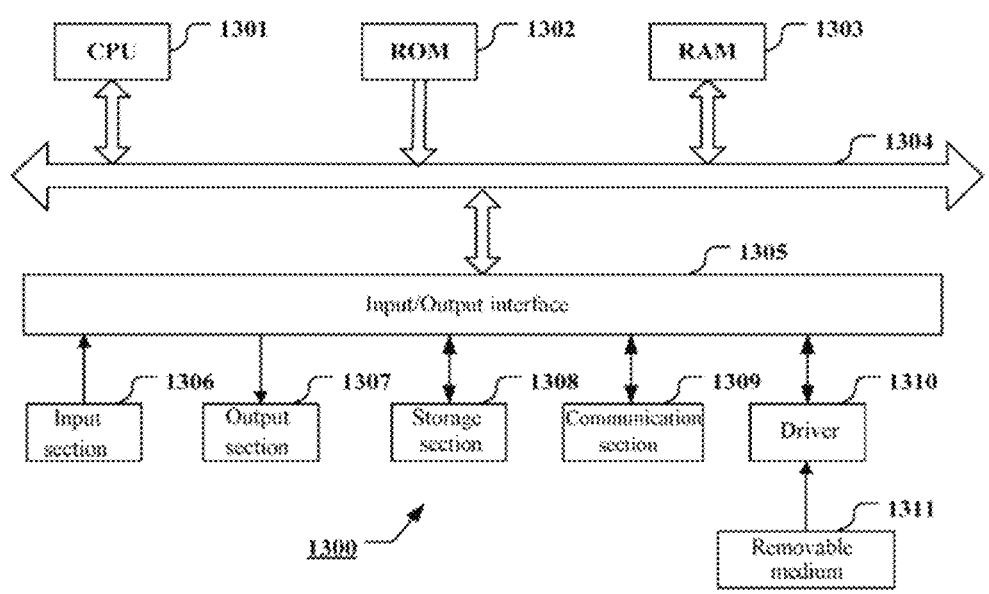
FIG. 13 is a block diagram showing an exemplary structure of a computer that implements a method and an apparatus according to the present disclosure.

In FIG. 13, a computation processing unit (CPU) 1301 may perform various processes based on a program stored in a read-only memory (ROM) 1302 or a program loaded in a random-access memory (RAM) 1303 from a storage section 1308. Data required for various processing and the like of the CPU 1301 may be stored in the RAM 1303 as needed. The CPU 1301, the ROM 1302 and the RAM 1303 are linked to each other via a bus 1304. An input/output interface 1305 is also linked to the bus 1304.

The following components are linked to the input/output interface 1305: an input section 1306 (including a keyboard, a mouse, and the like), an output section 1307 (including a display such as a cathode ray tube (CRT), a liquid crystal display (LCD) and the like, and a loudspeaker and the like), a storage section 1308 (including a hard disk and the like), and a communication section 1309 (including a network interface card such as a LAN card, a modem and the like). The communication section 1309 performs communication processing via a network such as the Internet. A driver 1310 may also be linked to the input/output interface 1305 as needed. A removable medium 1311 such as a magnetic disk, an optical disk, a magnetic optical disk, a semiconductor memory and the like is installed onto the driver 1310 as needed, such that a computer program read therefrom is installed into the storage section 1308 as needed.

In a case that the above series of processing are implemented by software, programs constituting the software are installed from a network such as the Internet or a storage medium such as the removable medium 1311.

Those skilled in the art should understand that the storage medium is not limited to the removable medium 1311 shown in FIG. 13 which stores programs and is distributed separately from the apparatus to provide the programs to a user. The removable medium 1311 may be, for example, a magnetic disk (including a floppy disk (registered trademark)), an optical disk (including a compact disk read-only memory (CD-ROM) and a digital versatile disk (DVD)), a magneto-optical disk (including a mini disc (MD) (registered trademark)), and a semiconductor memory. Alternatively, the storage medium may be an ROM 1302, a hard disk included in the storage section 1308 in which programs are stored, and the like, and is distributed to the user along with an apparatus in which they are incorporated.

An embodiment according to the present disclosure also relates to a program product storing a machine-readable instruction code. The method according to the above embodiments of the present disclosure may be performed when the instruction code is read and executed by a machine.

Accordingly, a storage medium for carrying the program product in which a machine-readable instruction code is stored is also provided in the present disclosure. The storage medium includes, but is not limited to, a soft disk, an optical disk, a magnetic optical disk, a memory card, a memory stick and the like.

The embodiments according to the present disclosure may further relate to the following electronic apparatus. In a case that the electronic apparatus is applied for a base station side, the electronic apparatus may be implemented as a gNB of any type, and an evolved node B (eNB) such as a macro eNB and a small eNB. The small eNB may be an eNB covering a cell smaller than a macro cell, such as a pico eNB, a micro eNB and a home (femto) eNB. Alternatively, the electronic apparatus may be implemented as any other types of base stations, such as a NodeB and a base transceiver station (BTS). The electronic apparatus may include: a main body (which is also referred to as a base station apparatus) configured to control wireless communication; and one or more remote radio heads (RRHs) arranged at a place different from the main body. In addition, various types of terminals described below may operate as base stations by temporarily or semi-persistently performing functions of a base station.

In a case that the electronic apparatus is used at a user equipment side, the electronic apparatus may be implemented as a mobile terminal (such as a smartphone, a tablet personal computer (PC), a notebook PC, a portable game terminal, a portable/dongle-type mobile router, and a digital camera device) or an in-vehicle terminal (such as a vehicle navigation device). Furthermore, the electronic apparatus may be a wireless communication module (such as an integrated circuit module including a single chip or multiple chips) mounted on each of the terminals described above.

Application Example of a Terminal Device

Figure 14:
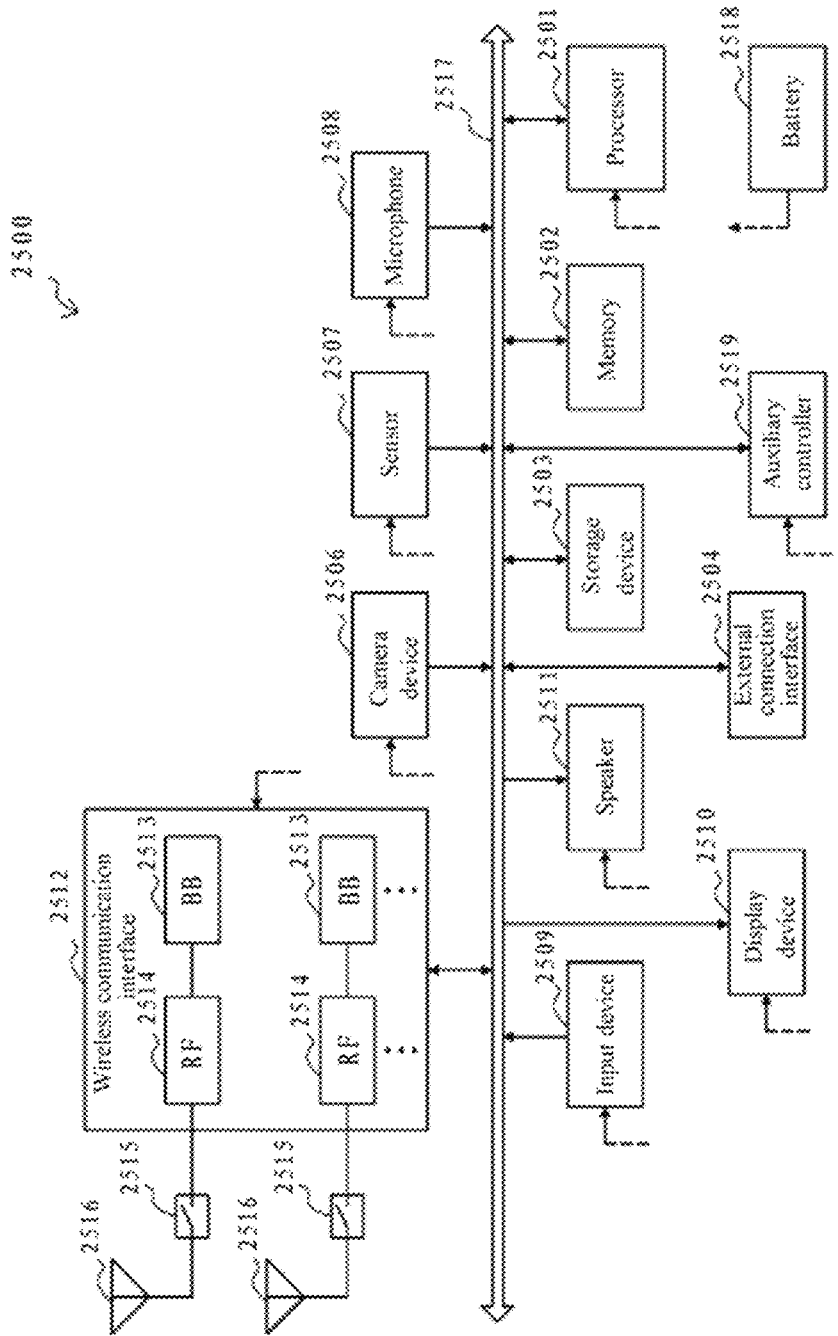
FIG. 14 is a block diagram showing an example of a schematic configuration of a smartphone to which the technology according to the present disclosure may be applied.

FIG. 14 is a block diagram illustrating an example of a schematic configuration of a smartphone 2500 to which the technology according to the present disclosure may be applied. The smartphone 2500 includes a processor 2501, a memory 2502, a storage device 2503, an external connection interface 2504, a camera device 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be for example a CPU or a System On Chip (SoC), and control functions of an application layer and another layer of the smartphone 2500. The memory 2502 includes an RAM and an ROM, and stores data, and programs executed by the processor 2501. The storage device 2503 may include a storage medium, such as a semiconductor memory and a hard disk. The external connection interface 2504 is an interface for connecting an external device (such as a memory card and a universal serial bus (USB) device) to the smartphone 2500.

The camera device 2506 includes an image sensor (such as a charge coupled device (CCD) and a complementary metal oxide semiconductor (CMOS)) and generates a captured image. The sensor 2507 may include a set of sensors, such as a measurement sensor, a gyroscope sensor, a geomagnetic sensor and an acceleration sensor. The microphone 2508 converts sound input into the smartphone 2500 into an audio signal. The input device 2509 includes for example a touch sensor configured to detect touch on a screen of the display device 2510, a keypad, a keyboard, a button or a switch, and receives an operation or information input from a user equipment. The display device 2510 includes a screen (such as a liquid crystal display (LCD) and an organic light emitting diode (OLED) display), and displays an output image of the smartphone 2500. The speaker 2511 converts the audio signal output from the smartphone 2500 into sound.

The wireless communication interface 2512 supports any cellular communication solution (such as LET and LTE-Advanced), and performs wireless communication. The wireless communication interface 2512 may generally include, for example, a BB processor 2513 and an RF circuit 2514. The BB processor 2513 may perform, for example, encoding/decoding, modulation/demodulation, and multiplexing/demultiplexing, and performs various types of signal processing for wireless communication. In addition, the RF circuit 2514 may include a frequency mixer, a filter and an amplifier, and transmits and receives a radio signal via the antenna 2516. The wireless communication interface 2512 may be a chip module on which the BB processor 2513 and the RF circuit 2514 are integrated. The wireless communication interface 2512 may include multiple BB processors 2513 and multiple RF circuits 2514, as shown in FIG. 14. Although FIG. 14 shows an example in which the wireless communication interface 2512 includes multiple BB processors 2513 and multiple RF circuits 2514, the wireless communication interface 2512 may also include a single BB processor 2513 or a single RF circuit 2514.

Furthermore, in addition to a cellular communication solution, the wireless communication interface 2512 may support another type of wireless communication solution such as a short-distance wireless communication solution, a near field communication solution, and a wireless local region network (LAN) solution. In this case, the wireless communication interface 2512 may include the BB processor 2513 and the RF circuit 2514 for each wireless communication solution.

Each of the antenna switches 2515 switches connection destinations of the antennas 2516 among multiple circuits (for example, circuits for different wireless communication solutions) included in the wireless communication interface 2512.

Each of the antennas 2516 includes a single antenna element or multiple antenna elements (such as multiple antenna elements included in a MIMO antenna), and is used for transmitting and receiving a radio signal by the wireless communication interface 2512. The smartphone 2500 may include multiple antennas 2516, as shown in FIG. 14. Although FIG. 14 shows an example in which the smartphone 2500 includes multiple antennas 2516, the smartphone 2500 may also include a single antenna 2516.

Furthermore, the smartphone 2500 may include the antenna 2516 for each wireless communication solution. In this case, the antenna switch 2515 may be omitted from the configuration of the smartphone 2500.

The bus 2517 connects the processor 2501, the memory 2502, the storage device 2503, the external connection interface 2504, the camera device 2506, the sensor 2507, the microphone 2508, the input device 2509, the display device 2510, the speaker 2511, the wireless communication interface 2512, and the auxiliary controller 2519 to each other. The battery 2518 supplies power to each block of the smartphone 2500 shown in FIG. 14 via feeder lines which are partially shown with dashed lines in figure. The auxiliary controller 2519, for example, operates a minimum necessary function of the smartphone 2500, for example, in a sleep mode.

In the smartphone 2500 shown in FIG. 14, a transceiver device of an apparatus for a user equipment side according to the embodiments of the present disclosure may be implemented by the wireless communication interface 2512. At least a part of the functions of a processing circuit and/or various units of the electronic device or information processing apparatus for the user equipment side according to the embodiments of the present disclosure may also be implemented by the processor 2501 or the auxiliary controller 2519. For example, power consumption of the battery 2518 may be reduced by performing a part of the functions of the processor 2501 by the auxiliary controller 2519. Furthermore, the processor 2501 or the auxiliary controller 2519 may perform at least a part of the functions of the processing circuit and/or various units of the electronic device or information processing apparatus for the user equipment side according to the embodiments of the present disclosure, by executing a program stored in the memory 2502 or the storage device 2503.

Application Example of a Base Station

Figure 15:
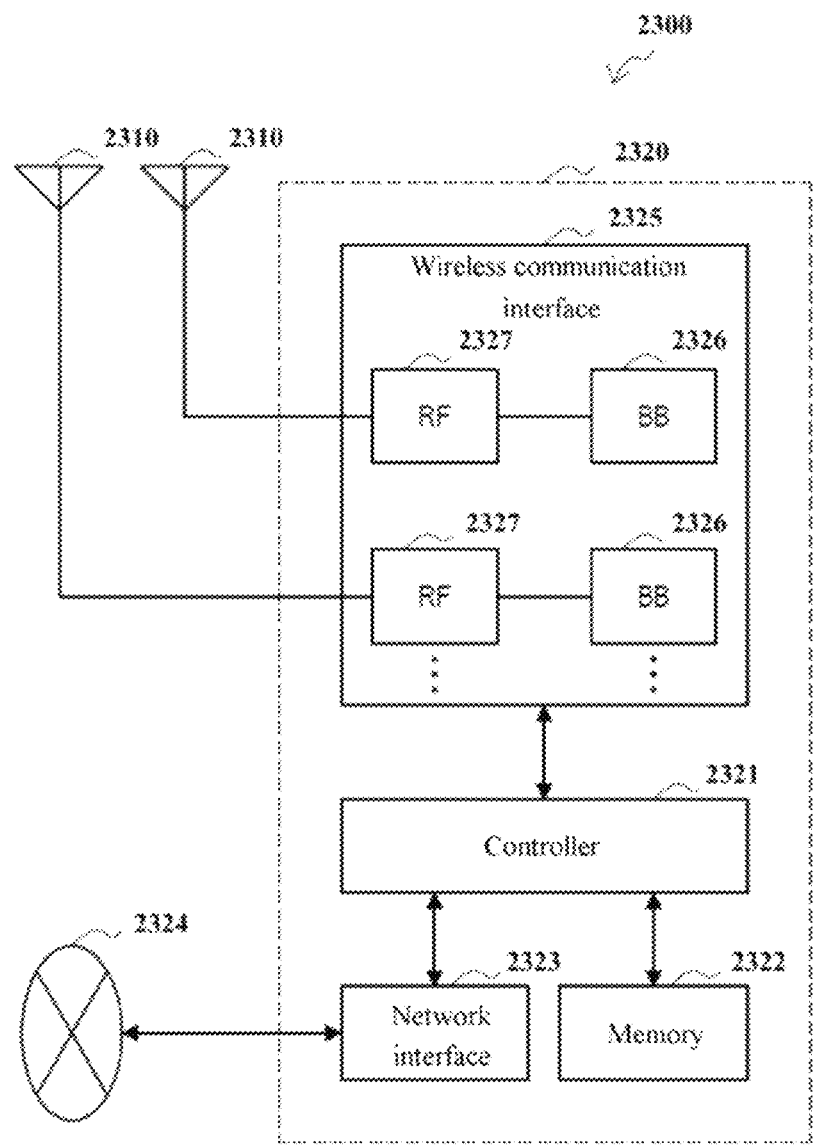
FIG. 15 is a block diagram showing an example of a schematic configuration of a gNB (a base station in a 5G system) to which the technology according to the present disclosure may be applied.
Figure 16:
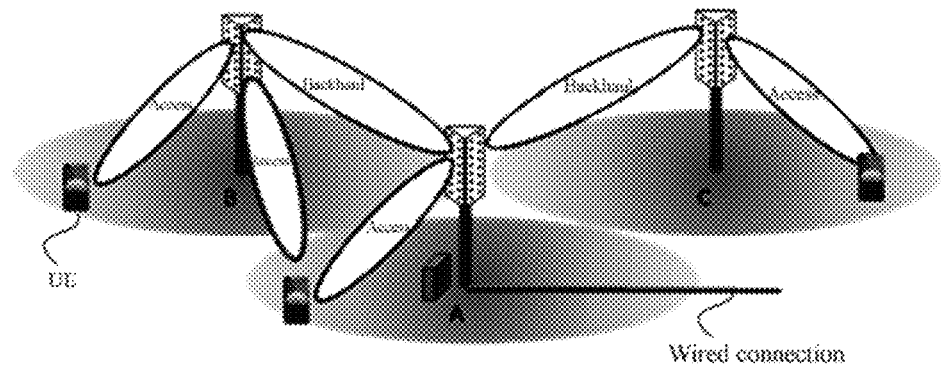
FIG. 16 is a schematic diagram illustrating an IAB network scenario.
Figure 17:
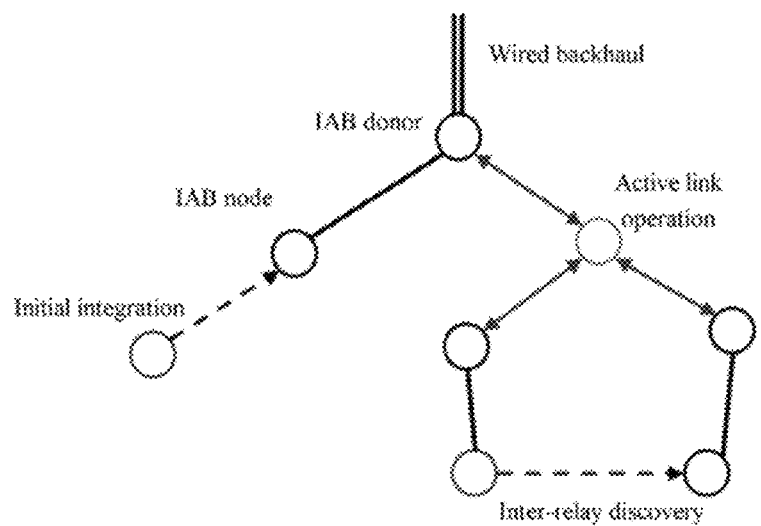
FIG. 17 and FIG. 18 are schematic diagram illustrating an IAB node discovering scenario.
Figure 18:
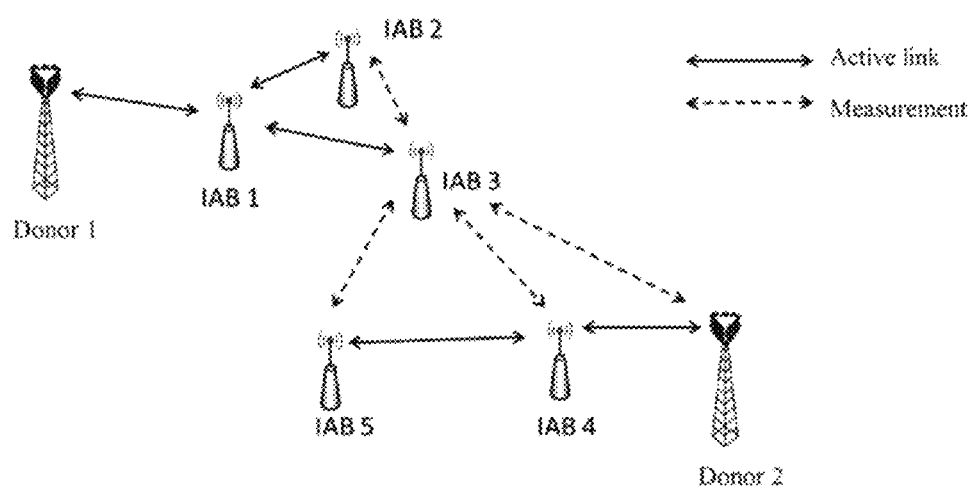

FIG. 15 is a block diagram showing an example of a schematic configuration of a gNB to which the technology according to the present disclosure may be applied. A gNB 2300 includes multiple antennas 2310, and a base station apparatus 2320. The base station apparatus 2320 may be connected to each antenna 2310 via a radio frequency (RF) cable.

Each of the antennas 2310 includes a single antenna element or multiple elements (such as multiple antenna elements included in a multiple input multiple output (MIMO) antenna), and is used for transmitting and receiving a radio signal by the base station apparatus 2320. The gNB 2300 may include multiple antennas 2310, as shown in FIG. 15. For example, the multiple antennas 2310 may be compatible with multiple frequency bands used by the gNB 2300.

The base station apparatus 2320 includes a controller 2321, a memory 2322, a network interface 2323, and a wireless communication interface 2325.

The controller 2321 may be, for example, a CPU or a DSP, and operates various functions of a higher layer of the base station apparatus 2320. For example, the controller 2321 generates a data packet based on data in a signal processed by the wireless communication interface 2325 and transfers the generated packet via the network interface 2323. The controller 2321 may bundle data from multiple baseband processors to generate a bundled packet and transfers the generated bundled packet. The controller 2321 may have a logic function that performs, for example, radio resource control, wireless bearer control, mobility management, admission control, and scheduling. The control may be performed in conjunction with an adjacent gNB or a core network node. The memory 2322 includes an RAM and an ROM, and stores a program that is executed by the controller 2321 and various types of control data (such as a terminal list, transmission power data, and scheduling data).

The network interface 2323 is a communication interface for connecting the base station apparatus 2320 to a core network 2324. The controller 2321 may communication with the core network node or another gNB via the network interface 2323. In that case, the gNB 2300 and the core network node or another gNB may be connected to each other through a logical interface (such as an S1 interface and an X2 interface). The network interface 2323 may also be a wired communication interface, or a wireless communication interface for radio backhaul. If the network interface 2323 is a wireless communication interface, the network interface 2323 may use a higher frequency band for wireless communication as compared with the frequency band used by the wireless communication interface 2325.

The wireless communication interface 2325 supports any cellular communication solution (such as long term evolution (LTE) and LTE-Advanced), and provides a wireless connection to a terminal positioned in a cell of the gNB 2300 via the antenna 2310. The wireless communication interface 2325 may generally include, for example, a BB processor 2326 and an RF circuit 2327. The BB processor 2326 may perform, for example encoding/decoding, modulation/demodulation and multiplexing/demultiplexing, and perform various types of signal processing of a layer (for example L1, medium access control (MAC), radio link control (RLC) and packet data convergence protocol (PDCP)). The BB processor 2326 may have a part or all of the above-described logical functions instead of the controller 2321. The BB processor 2326 may be a memory storing communication control programs, or a module including a processor and a related circuit which are configured to execute programs. The function of the BB processor 2326 may be changed through program updating. The module may be a card or a blade inserted into a slot of the base station apparatus 2320. Alternatively, the module may also be a chip that is mounted on the card or the blade. In addition, the RF circuit 2327 may include, for example, a frequency mixer, a filter, and an amplifier, and transmits and receives a radio signal via the antenna 2310.

The wireless communication interface 2325 may include the multiple BB processors 2326, as shown in FIG. 15. For example, the multiple BB processors 2326 may be compatible with multiple frequency bands used by the gNB 2300. As shown in FIG. 15, the wireless communication interface 2325 may include multiple RF circuits 2327. For example, the multiple RF circuits 2327 may be compatible with multiple antenna elements. Although FIG. 15 shows an example in which the wireless communication interface 2325 includes multiple BB processors 2326 and multiple RF circuits 2327, the wireless communication interface 2325 may also include a single BB processor 2326 or a single RF circuit 2327.

In the eNB 2300 shown in FIG. 15, a transceiving device of the wireless communication apparatus for the base station side may be implemented by the wireless communication interface 2325. At least a part of the functions of the processing circuit and/or various units of the electronic device or the wireless communication apparatus for the base station side may also be implemented by the controller 2321. For example, the controller 2321 may perform at least a part of the functions of the processing circuit and/or various units of the electronic device or the wireless communication apparatus for the base station side, by executing a program stored in the memory 2322.

In the above description of specific embodiments of the present disclosure, the features described and/or illustrated for one embodiment may be used in one or more other embodiments in the same or similar manner, may be combined with features in the other embodiments, or may replace the features in the other embodiments.

It should be emphasized that the term "including/comprising", when used herein, refers to the presence of a feature, an element, a step or a component, but does not exclude the presence or addition of one or more other features, elements, steps or components.

In the above embodiments and examples, reference numerals composed of number are used to indicate each step and/or unit. It will be understood by those of ordinary skill in the art that these reference numerals are for purpose of illustration and drawing and are not indicative of the order or any other limitations thereof.

Furthermore, the method according to the present disclosure is not limited to being executed in the chronological order described in the specification, or may be executed in other chronological order, in parallel or independently. Therefore, the order of execution of the method described in this specification does not limit the technical scope of the present disclosure.

Although the present disclosure has been disclosed above through the description of specific embodiments of the present disclosure, it should be understood that all the embodiments and examples described above are illustrative and not restrictive. Various modifications, improvements and equivalents may be made to the present disclosure by those skilled in the art within the scope and spirit of accompanying claims. These modifications, improvements or equivalents should fall within the scope of protection of the present disclosure.

Furthermore, an embodiment according to the present disclosure further includes:

(1) An electronic device for wireless communication, comprising processing circuitry configured to:

preform control to transmit or receive configuration information related to configuration of a reference signal for a discovery process of an Integrated Access and Backhaul link IAB node.

(2) The electronic device according to (1), wherein the reference signal comprises Synchronization Signal Block SSBs, and the configuration information comprises a multiplexing manner of a SSB for an access link and a SSB for a backhaul link.

(3) The electronic device according to (2), wherein the multiplexing manner comprises:

allocating a part of SSB resource positions in a period of the SSB for the access link to the SSB for the backhaul link; and/or increasing a period of the SSB for the access link, and arranging the SSB for the backhaul link in an increased part of the period.

(4) The electronic device according to (2), wherein the multiplexing manner is adjusted based on an access performance of a user equipment, the adjusting comprises:

in a case that the access performance decreases, increasing a SSB for the access link.

(5) The electronic device according to (4), wherein the adjusting is triggered in a case that an access latency of the user equipment exceeds a predetermined threshold.

(6) The electronic device according to (2), wherein the multiplexing manner comprises:

applying different power levels to the SSB for the access link and the SSB for the backhaul link; and/or setting a specific SSB resource position as the SSB for the access link.

(7) The electronic device according to (1), wherein the reference signal comprises Channel State Information Reference Signal CSI-RSs, and the configuration information comprises a multiplexing manner of a CSI-RS for an access link and a CSI-RS for a backhaul link.

(8) The electronic device according to (7), wherein the multiplexing manner comprises:

transmitting the CSI-RS for the backhaul link using a directional beam, and multiplexing time-frequency resources of the CSI-RS for the access link and the CSI-RS for the backhaul link.

(9) The electronic device according to (8), wherein the node comprises a donor node and a relay node, and the multiplexing manner is determined in the following manner:

configuring, by the donor node, parameter information of a directional beam for the relay node based on physical position information of the relay node and a connection relationship among the relay nodes;

configuring, by the donor node, parameter information of directional beams for the relay node and a candidate node around the relay node based on direction information related to the candidate node which is detected and reported by the relay node; or configuring, by the relay node, parameter information of a directional beam based on direction information related to a surrounding candidate node which is detected by the relay node, and reporting, by the relay node, the configured parameter information to the donor node.

(10) The electronic device according to (9), wherein the physical position information of the relay node and the connection relationships among the relay nodes are reported by the relay node to the donor node.

(11) The electronic device according to (7), wherein the multiplexing manner comprises:

transmitting the CSI-RS for the backhaul link in an omnidirectional mode, and adopting orthogonal time-frequency resources for the CSI-RS for the access link and the CSI-RS for the backhaul link.

(12) The electronic device according to (11), wherein the node comprises a donor node and a relay node, and the multiplexing manner is determined in the following manner:

configuring, by the donor node, the time-frequency resources for the relay node based on physical position information of the relay node and a connection relationship among the relay nodes; or configuring, by the relay node, the time-frequency resources for a subordinate node of the relay node, and reporting, by the relay node, the configured time-frequency resources to the donor node.

(13) The electronic device according to (1), wherein the reference signal comprises Synchronization Signal Block SSBs, and the configuration information comprises a multiplexing manner of transmission and/or reception for the SSB.

(14) The electronic device according to (13), wherein the multiplexing manner comprises:

time resources for transmission of SSBs of adjacent nodes being orthogonal.

(15) The electronic device according to (14), wherein the node comprises a donor node and a relay node, and the multiplexing manner is determined in the following manner:

configuring, by the donor node, time resources for transmission of the SSB of the relay node based on physical position information of the relay node and a connection relationship among the relay nodes;

configuring, by the relay node, the time resources for a subordinate node of the relay node, and reporting, by the relay node, the configured time resources to the donor node; or detecting, by the relay node, a SSB transmitted by a surrounding node based on a hop count of the relay node, configuring, by the relay node, the time resources for itself based on a detection result, and reporting, by the relay node, the configured time resources to the donor node.

(16) The electronic device according to (12), wherein the node comprises a donor node and a relay node, and the multiplexing manner comprises:

in a case that a link quality of a backhaul link of the relay node is lower than a predetermined threshold, adjusting at least a part of the time resources for the transmission of the SSB to be used for reception for the SSB.

(17) The electronic device according to (16), wherein the predetermined threshold is configured by the donor node for the relay node.

(18) The electronic device according to (16), wherein the multiplexing manner further comprises:

in a case that at least the part of the time resources is adjusted to be used for reception for the SSB, adjusting, for an adjacent node of the relay node, corresponding time-frequency resources to be used for transmission for the SSB.

(19) The electronic device according to (16), wherein the adjusting is performed in the following manner:

transmitting, in a case that the link quality of the backhaul link of the relay node is lower than the predetermined threshold, a request to the donor node by the relay node; and configuring, by the donor node, more time resources for reception of the SSB for the relay node based on the request.

(20) The electronic device according to (1), wherein the reference signal comprises Synchronization Signal Block SSBs, and the configuration information comprises a manner of transmitting a SSB for an access link and a SSB for a backhaul link by an adjacent node.

(21) The electronic device according to (20), wherein the manner comprises:

transmitting, by the adjacent node, the SSB for the access link and the SSB for the backhaul link through orthogonal time resources; or transmitting, by the adjacent node, the SSB for the backhaul link using a directional beam.

(22) The electronic device according to any one of (1) to (21), wherein the node comprises a donor node and a relay node, and the processing circuitry is further configured to:

acquire hop count information indicating a relay hop count of the relay node from the donor node.

(23) The electronic device according to (22), wherein acquiring the hop count comprises:

determining a relay hop count of a relay node which transmits the reference signal, based on a predetermined correspondence between a resource position of the reference signal and the relay hop count, wherein the reference signal comprises a Synchronization Signal Block SSB, a Channel State Information Reference Signal CSI-RS or a system information block signal, and wherein the predetermined correspondence is notified by the donor node to the relay node.

(24) The electronic device according to (22), wherein acquiring the hop count comprises:

acquiring the hop count information from a master system information block, radio resource control signaling or the reference signal transmitted by a node.

(25) The electronic device according to (22), wherein the processing circuitry is further configured to perform reselection of a backhaul link based on the following conditions:

hop counts of a current connection node and a candidate connection code; and/or link qualities of a current connection node and a candidate connection node.

(26) The electronic device according to (25), wherein the reselection is performed in the following manner:

determining, in a case that the condition of the candidate connection node is better than the condition of the current connection node, to switch to the candidate connection node;

selecting a candidate connection node to be switched to, based on the conditions of a plurality of candidate connection nodes measured in a given time window; or reporting the conditions of the plurality of candidate connection nodes measured in a given time window to the donor node, and selecting, by the donor node, a candidate connection node to be switched to.

(27) The electronic device according to any one of (1) to (21), wherein the processing circuitry is further configured to:

determine, based on a time offset between signals of different nodes connected via a backhaul link, an adjustment of synchronization time for at least one node of the different nodes.

(28) The electronic device according to (27), wherein the adjustment comprises:

adjusting, in a case that an offset between a Synchronization Signal Block SSB for a superior node and a Synchronization Signal Block SSB for a subordinate node which are connected via a backhaul link exceeds a predetermined threshold, synchronization time for the subordinate node.

(29) The electronic device according to (28), wherein the processing circuitry is further configured to:

in a case that the offset between the SSB for the superior node and the SSB for the subordinate node is greater than a predetermined upper limit, determine, for the subordinate node, the configuration information as reducing a monitoring period for the SSB or increasing monitoring positions for the SSB; and/or in a case that the offset between the SSB for the superior node and the SSB for the subordinate node is lower than a predetermined lower limit, determine, for the subordinate node, the configuration information as increasing a monitoring period for the SSB or reducing monitor positions for the SSB.

(30) The electronic device according to (27), wherein the adjustment comprises:

adjusting, in a case that an offset between a Synchronization Signal Block SSB from a first node and a Synchronization Signal Block SSB from a third node which are received by a second node exceeds a predetermined threshold, synchronization time for the third node, wherein the first node, the second node and the third node are connected via a backhaul link, the first node is a superior node for the second node, and the second node is a superior node for the third node.

(31) The electronic device according to (27), wherein the adjustment is determined in the following manner:

transmitting, by a first node, timing configuration to a second node connected with the first node via a backhaul link;

transmitting, by the second node, a synchronization maintenance signal to the first node based on the timing configuration; and determining, by the first node, an adjustment of synchronization time for the first node or the second node based on the timing configuration and a timing for the synchronization maintenance signal.

(32) A wireless communication method, comprising:

transmitting or receiving configuration information related to configuration of a reference signal for a discovery process of an Integrated Access and Backhaul link IAB node.

(33) An electronic device for wireless communication, comprising processing circuitry configured to:

acquire hop count information indicating a relay hop count of a relay node from a donor node, wherein the donor node is an Integrated Access and Backhaul link IAB node which is in wired connection with a core network, and the relay node is an Integrated Access and Backhaul link IAB node which is not in wired connection with the core network.

(34) The electronic device according to (33), wherein acquiring the hop count information comprises:

determining a hop count of a relay node that transmits a Synchronization Signal Block SSB based on a predetermined correspondence between a time resource position of the SSB and a relay hop count.

(35) The electronic device according to (33), wherein acquiring the hop count information comprises:

acquiring the hop count information from a master system information block, radio resource control signaling or a reference signal for a discovery process of an Integrated Access and Backhaul link IAB node transmitted by the relay node.

(36) The electronic device according to (33), wherein the processing circuitry is further configured to perform reselection of a backhaul link based on the following conditions:

hop counts of a current connection node and a candidate connection code; and/or link qualities of a current connection node and a candidate connection node.

(37) The electronic device according to (36), wherein the reselection is performed in the following manner:

determining, in a case that the condition of the candidate connection node is better than the condition of the current connection node, to switch to the candidate connection node;

selecting a candidate connection node to be switched to, based on the conditions of a plurality of candidate connection nodes measured in a given time window; or reporting the conditions of the plurality of candidate connection nodes measured in a given time window to the donor node, and selecting, by the donor node, a candidate connection node to be switched to.

(38) A wireless communication method, comprising:

acquiring hop count information indicating a relay hop count of a relay node from a donor node, wherein the donor node is an Integrated Access and Backhaul link IAB node which is in wired connection with a core network, and the relay node is an Integrated Access and Backhaul link IAB node which is not in wired connection with the core network.

(39) An electronic device for wireless communication, comprising processing circuitry configured to:

determine, based on a time offset between signals of different nodes connected via a backhaul link, an adjustment of synchronization time for at least one node of the different nodes.

(40) The electronic device according to (39), wherein the adjustment comprises:

adjusting, in a case that an offset between a Synchronization Signal Block SSB for a superior node and a Synchronization Signal Block SSB for a subordinate node which are connected via a backhaul link exceeds a predetermined threshold, synchronization time for the subordinate node.

(41) The electronic device according to (40), wherein the processing circuitry is further configured to:

in a case that the offset between the SSB for the superior node and the SSB for the subordinate node is greater than a predetermined upper limit, cause the subordinate node to reduce a monitoring period for the SSB or increase monitoring positions for the SSB; and/or in a case that the offset between the SSB for the superior node and the SSB for the subordinate node is lower than a predetermined lower limit, cause the subordinate node to increase a monitoring period for the SSB or reduce monitoring positions for the SSB.

(42) The electronic device according to (39), wherein the adjustment comprises:

adjusting, in a case that an offset between a Synchronization Signal Block SSB from a first node and a Synchronization Signal Block SSB from a third node which are received by a second node is greater than a predetermined threshold, synchronization time for the third node, wherein the first node, the second node and the third node are connected via a backhaul link, the first node is a superior node for the second node, and the second node is a superior node for the third node; and/or adjusting, by the second node, a transition gap between an uplink and a downlink based on the offset, wherein the transition gap is configured by a donor node or by a superior node for the second node.

(43) The electronic device according to (39), wherein the adjustment is determined in the following manner:

transmitting, by a first node, timing configuration to a second node connected with the first node via a backhaul link;

transmitting, by the second node, a synchronization maintenance signal to the first node based on the timing configuration;

determining, by the first node, an adjustment of synchronization time for the first node or the second node based on the timing configuration and a timing for the synchronization maintenance signal.

(44) A wireless communication method, comprising:

determining, based on a time offset between signals of different nodes connected via a backhaul link, an adjustment of synchronization time for at least one node of the different nodes.

(45) A computer readable medium comprising executable instructions that, when executed by an information processing apparatus, cause the information processing apparatus to implement the method according to any one of (32), (38) and (44).

The invention claimed is:

1. An electronic device for wireless communication, comprising processing circuitry configured to:

perform control to transmit or receive configuration information related to configuration of a reference signal for a discovery process of an Integrated Access and Backhaul link (IAB) node, wherein, based on the reference signal comprises Synchronization Signal Block (SSBs):

the configuration information comprises a multiplexing manner of a SSB for an access link and a SSB for a first backhaul link, and the multiplexing manner comprises at least one of:

applying different power levels to the SSB for the access link and the SSB for the first backhaul link, or setting a specific SSB resource position as the SSB for the access link, and wherein, based on the reference signal comprising Channel State Information Reference Signal (CSI-RSs):

the configuration information comprises a multiplexing manner of a CSI-RS for an access link and a CSI-RS for a second backhaul link, and the multiplexing manner comprises transmitting the CSI-RS for the second backhaul link in an omnidirectional mode, and adopting orthogonal time-frequency resources for the CSI-RS for the access link and the CSI-RS for the second backhaul link.

2. An electronic device for wireless communication, comprising processing circuitry configured to:

determine, based on a time offset between signals of different nodes connected via a backhaul link, an adjustment of synchronization time for at least one node of the different nodes, wherein the adjustment comprises:

in a case that an offset between a Synchronization Signal Block (SSB) for a superior node and a SSB for a subordinate node which are connected via a first backhaul link exceeds a predetermined threshold, adjusting synchronization time for the subordinate node, in a case that an offset between a SSB from a first node and a SSB from a third node which are received by a second node is greater than a predetermined threshold, one of:
  adjusting synchronization time for the third node, wherein the first node, the second node and the third node are connected via a second backhaul link the first node is a superior node for the second node, and the second node is a superior node for the third node; or
  adjusting, by the second node, a transition nap between an uplink and a downlink based on the offset wherein the transition nap is configured by a donor node or by a superior node for the second node.

3. An electronic device for wireless communication, comprising processing circuitry configured to:
  determine, based on a time offset between signals of different nodes connected via a backhaul link, an adjustment of synchronization time for at least one node of the different nodes,
  wherein the adjustment is determined in the following manner:
  transmitting, by a first node, timing configuration to a second node connected with the first node via a backhaul link;
  transmitting, by the second node, a synchronization maintenance signal to the first node based on the timing configuration;
  determining, by the first node, an adjustment of synchronization time for the first node or the second node based on the timing configuration and a timing for the synchronization maintenance signal.

* * * * *